US012679111B2

(12) United States Patent
Tomioka

(10) Patent No.: US 12,679,111 B2
(45) Date of Patent: Jul. 14, 2026

(54) DIELECTRIC HEATING APPARATUS AND PRINTING SYSTEM

(71) Applicant: SEIKO EPSON CORPORATION, Tokyo (JP)

(72) Inventor: Hiroto Tomioka, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 788 days.

(21) Appl. No.: 18/100,587

(22) Filed: Jan. 24, 2023

(65) Prior Publication Data

US 2023/0234375 A1 Jul. 27, 2023

(30) Foreign Application Priority Data

Jan. 25, 2022 (JP) ................................ 2022-009218

(51) Int. Cl.

| | |
|---|---|
| ***B41J 11/00*** | (2006.01) |
| ***H05B 6/10*** | (2006.01) |
| ***H05B 6/46*** | (2006.01) |
| ***H05B 6/54*** | (2006.01) |
| ***H05B 6/64*** | (2006.01) |
| ***H05B 6/76*** | (2006.01) |

(52) U.S. Cl.

CPC ........ *B41J 11/00216* (2021.01); *B41J 11/002* (2013.01); *B41J 11/0024* (2021.01); *H05B 6/46* (2013.01); *H05B 6/54* (2013.01); *H05B 6/64* (2013.01); *H05B 6/76* (2013.01); *H05B 6/107* (2013.01)

(58) Field of Classification Search

CPC . B41J 11/002; B41J 11/0021; B41J 11/00216; B41J 11/0024; H05B 6/46; H05B 6/54; H05B 6/64; H05B 6/76; H05B 6/763; H05B 6/766; F26B 3/347

See application file for complete search history.

(56) References Cited

U.S. PATENT DOCUMENTS 3,041,435 A * 6/1962 Cameron ................ H04B 1/03 331/169
6,354,015 B1 * 3/2002 Ogasawara ........ B41J 11/00212 34/60

(Continued)

FOREIGN PATENT DOCUMENTS

CN 211075120 U 7/2020
JP 2004-213962 A 7/2004

(Continued)

*Primary Examiner* — Alain Chau
(74) *Attorney, Agent, or Firm* — Harness, Dickey & Pierce, P.L.C.

(57) ABSTRACT

A dielectric heating apparatus includes: a conveyance unit configured to convey an object to be heated; an electrode unit including a first electrode and a second electrode which face the object to be heated, that is conveyed in a first direction, in a second direction intersecting the first direction and which are applied with an alternating current voltage; and a metal first cover unit configured to surround the electrode unit. The first cover unit includes a first insertion port through which the object to be heated is inserted into the first cover unit, a first feed-out port through which the object to be heated is fed out of the first cover unit, and a plurality of first opening portions that are different from the first insertion port and the first feed-out port.

19 Claims, 15 Drawing Sheets

(56) References Cited

U.S. PATENT DOCUMENTS

| | | | | |
|---|---|---|---|---|
| 9,358,809 | B2 * | 6/2016 | Biegelsen | H05B 6/80 |
| 10,717,302 | B2 * | 7/2020 | Yanagidaira | B41J 11/0022 |
| 10,737,511 | B2 * | 8/2020 | Yoda | B41J 11/00216 |
| 10,899,143 | B2 * | 1/2021 | Yoda | B41J 11/0022 |
| 12,389,500 | B2 * | 8/2025 | Watanabe | H05B 6/72 |
| 2016/0338154 | A1 * | 11/2016 | Nagahisa | H05B 6/62 |
| 2017/0066254 | A1 * | 3/2017 | Inoue | B41J 11/00216 |
| 2018/0236803 | A1 * | 8/2018 | Norte | B41F 23/0406 |
| 2019/0001707 | A1 * | 1/2019 | Yoda | B41J 11/00216 |
| 2019/0100034 | A1 * | 4/2019 | Yoda | B41J 11/00216 |
| 2019/0299661 | A1 * | 10/2019 | Yanagidaira | B41J 11/0021 |
| 2020/0406659 | A1 * | 12/2020 | Aizawa | B41M 7/0081 |
| 2021/0307132 | A1 | 9/2021 | Aizawa | |
| 2022/0055365 | A1 * | 2/2022 | Sasaki | H05H 1/466 |
| 2022/0111663 | A1 * | 4/2022 | Kamihara | B41J 11/00216 |
| 2023/0284351 | A1 * | 9/2023 | Watanabe | H05B 6/6458 347/102 |
| 2024/0365523 | A1 * | 10/2024 | Uemura | H05K 3/3436 |

FOREIGN PATENT DOCUMENTS

| | | | | | |
|---|---|---|---|---|---|
| JP | 2006-258831 | A | | 9/2006 | |
| JP | 2017-114001 | A | | 6/2017 | |
| JP | 2017-119386 | A | | 7/2017 | |
| JP | 2017165000 | A | * | 9/2017 | B41J 11/00216 |
| JP | 2018001501 | A | * | 1/2018 | G03G 15/234 |
| JP | 2021-049699 | A | | 4/2021 | |
| JP | 2021-163575 | A | | 10/2021 | |

* cited by examiner

DIELECTRIC HEATING APPARATUS AND PRINTING SYSTEM

The present application is based on, and claims priority from JP Application Serial Number 2022-009218, filed Jan. 25, 2022, the disclosure of which is hereby incorporated by reference herein in its entirety.

BACKGROUND

1. Technical Field

The present disclosure relates to a dielectric heating apparatus and a printing system.

2. Related Art

JP-A-2004-213962 discloses a microwave heating apparatus including a rectangular parallelepiped metal casing which is electromagnetically shielded. In this heating apparatus, an object to be heated is heated by microwaves in the casing. The casing is provided with an opening for receiving an object to be heated and an opening for feeding out the object to be heated, and both openings are sealed so as not to leak microwaves.

A vapor generated by heating may retain in the casing when heating the object to be heated in the casing in order to prevent leakage of electromagnetic waves. Therefore, for example, a liquid generated by condensation of the retained vapor may contaminate the object to be heated or the drying efficiency may be decreased when the object to be heated is dried by heating.

SUMMARY

According to a first aspect of the present disclosure, a dielectric heating apparatus is provided. The dielectric heating apparatus includes: a conveyance unit configured to convey an object to be heated; an electrode unit including a first electrode and a second electrode which face the object to be heated, that is conveyed in a first direction, in a second direction intersecting the first direction and which are applied with an alternating current voltage; and a metal first cover unit surrounding the electrode unit. The first cover unit includes a first insertion port for inserting the object to be heated into the first cover unit, a first feed-out port for feeding the object to be heated out of the first cover unit, and a plurality of first opening portions that are different from the first insertion port and the first feed-out port.

According to a second aspect of the present disclosure, a dielectric heating apparatus is provided. The dielectric heating apparatus includes: a conveyance unit configured to convey an object to be heated; an electrode unit including a first electrode and a second electrode which face the object to be heated, that is conveyed in a first direction, in a second direction intersecting the first direction and which are applied with an alternating current voltage; a movement unit configured to reciprocate the electrode unit in a fifth direction which intersects the first direction and which is orthogonal to the second direction; a metal fourth cover unit facing, in the second direction, the object to be heated that is conveyed in the first direction and covering the electrode unit; and a metal facing unit facing, in a direction along the second direction, the first electrode and the second electrode with the object to be heated interposed therebetween. The fourth cover unit is configured to reciprocate in the fifth direction together with the electrode unit, and includes a fifth opening portion opened toward the object to be heated in the second direction and surrounding the first electrode and the second electrode when viewed along the second direction.

According to a third aspect of the present disclosure, a printing system is provided. The printing system includes: the dielectric heating apparatus according to the above aspect; and a liquid discharge unit configured to discharge a liquid to a printing medium. The conveyance unit conveys, as the object to be heated, the printing medium on which the liquid is adhered.

DESCRIPTION OF EXEMPLARY EMBODIMENTS

A. First Embodiment

Figure 1:
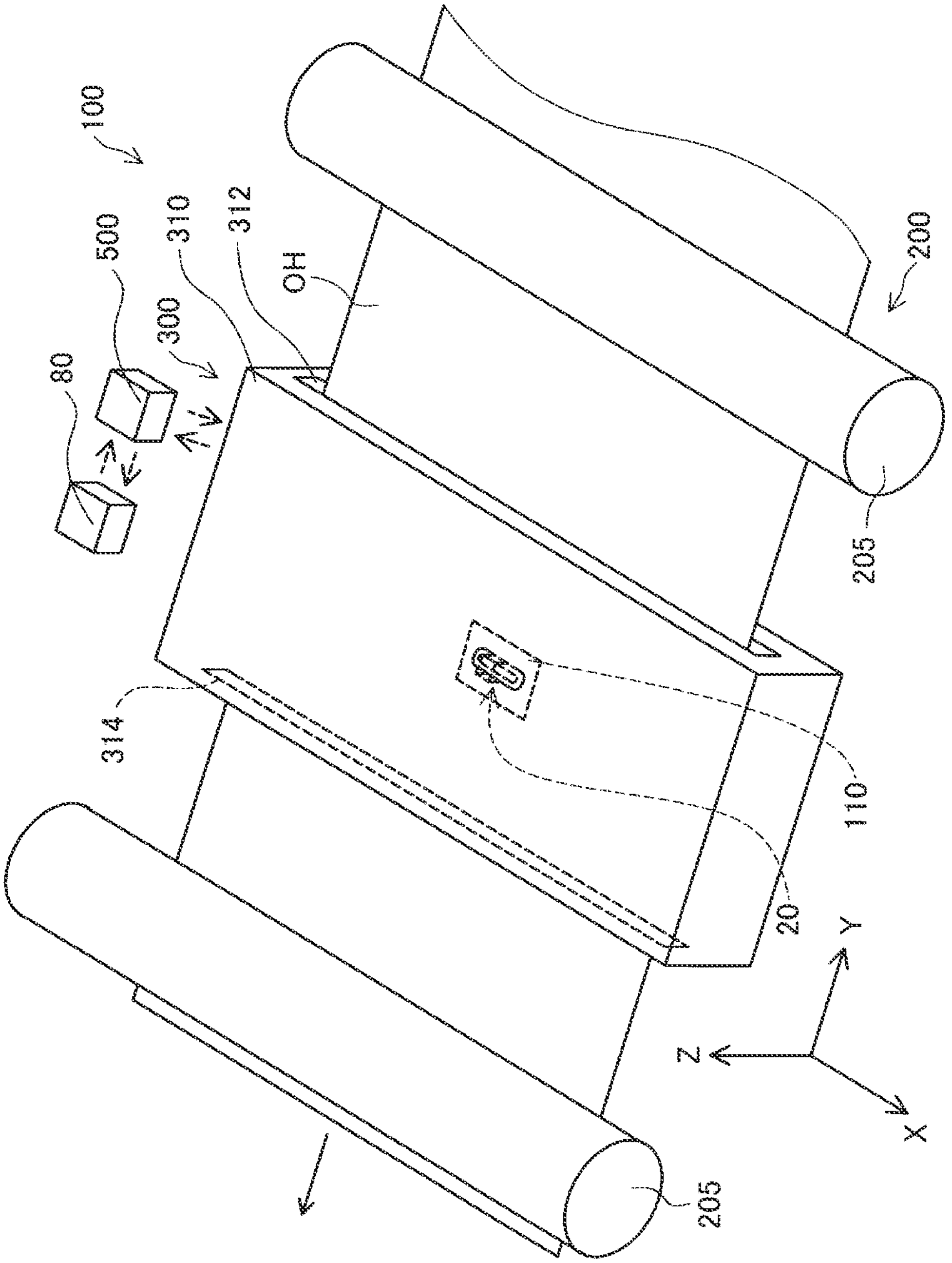
FIG. 1 is a perspective diagram showing a schematic configuration of a dielectric heating apparatus according to a first embodiment.

FIG. 1 is a perspective diagram showing a schematic configuration of a dielectric heating apparatus 100 according to a first embodiment. In FIG. 1, arrows indicating X, Y, and Z directions orthogonal to each other are shown. The X direction and the Y direction are directions parallel to a horizontal plane, and the Z direction is a direction along a vertically upward direction. The arrows indicating the X, Y, and Z directions are appropriately shown in other figures such that the shown directions correspond to those in FIG. 1. In the following description, when a direction is specified, a direction indicated by an arrow in each figure is referred to as "+", an opposite direction is referred to as "−", and a positive or negative sign is used in combination with a direction notation. Hereinafter, a +Z direction is also referred to as "up", and a −Z direction is also referred to as "down". In the present description, the term "orthogonal" includes a range of 90°+10°.

The dielectric heating apparatus 100 includes an electrode unit 20 that heats an object OH to be heated, a conveyance unit 200 that conveys the object OH to be heated, a case unit 300 that accommodates the electrode unit 20, a voltage application unit 80 that applies an alternating current voltage to the electrode unit 20, and a control unit 500. The case unit 300 in the present embodiment includes a metal first cover unit 310 that surrounds the electrode unit 20.

The dielectric heating apparatus 100 heats the object OH to be heated by an electric field generated from the electrode unit 20 in the first cover unit 310 while conveying the object OH to be heated by the conveyance unit 200. In the present embodiment, the dielectric heating apparatus 100 heats, as the object OH to be heated, a sheet-shaped printing medium on which a liquid is applied, so as to dry the object OH to be heated. As the printing medium, for example, paper, cloth, or a film is used. As the liquid to be applied to the printing medium, for example, various inks containing water or an organic solvent as a main component are used. The liquid is applied to the printing medium by, for example, a liquid discharge device such as an inkjet printer.

The control unit 500 includes a computer including one or a plurality of processors, a storage device, and an input and output interface that exchanges a signal with the outside. The control unit 500 performs heating of the object OH to be heated in the dielectric heating apparatus 100 by controlling each unit such as the conveyance unit 200 and the voltage application unit 80 described above. The control unit 500 may include a plurality of computers.

The conveyance unit 200 in the present embodiment includes two conveyance rollers 205 and a drive unit (not shown) including a motor that drives the conveyance rollers 205, or the like. The conveyance unit 200 conveys the sheet-shaped object OH to be heated by driving the conveyance rollers 205.

The object OH to be heated is inserted into the first cover unit 310 through a first insertion port 312 provided in the first cover unit 310 while being conveyed by the conveyance unit 200. Then, the object OH to be heated is heated by the electrode unit 20 in the first cover unit 310 while being conveyed in the same manner, and is then fed out of the first cover unit 310 through a first feed-out port 314 provided in the first cover unit 310. The details of the case unit 300 will be described later.

Figure 2:
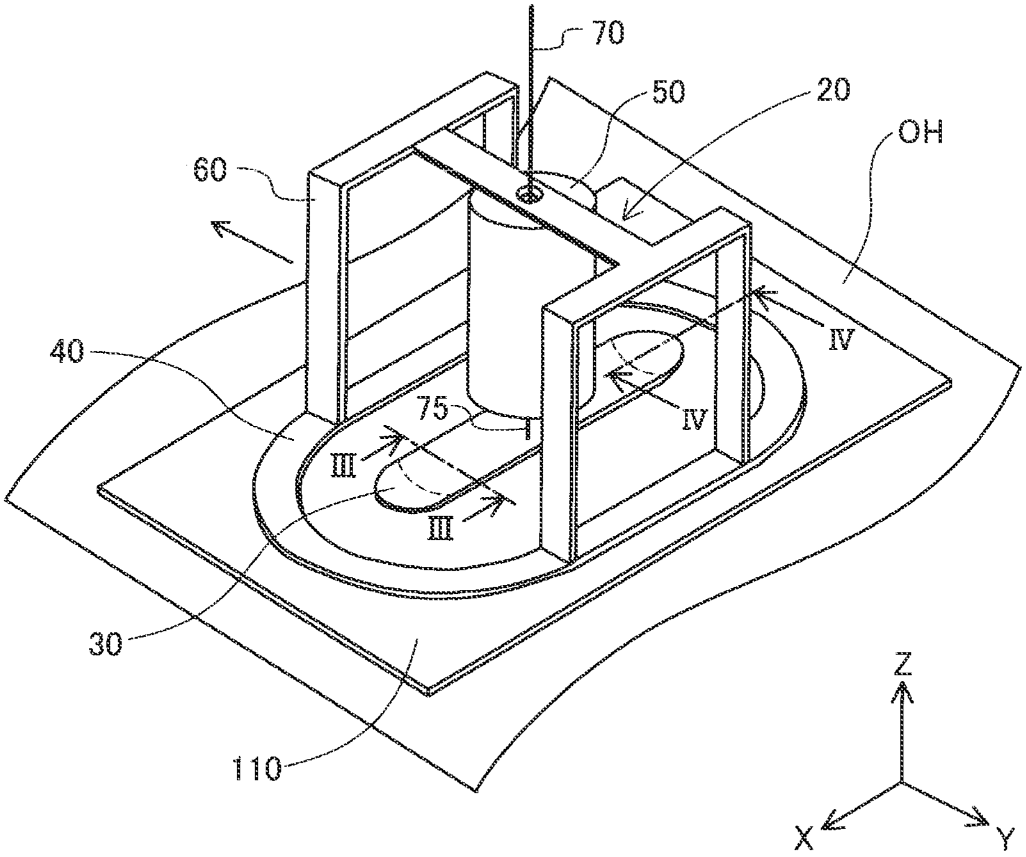
FIG. 2 is a perspective diagram showing a schematic configuration of an electrode unit.

FIG. 2 is a perspective diagram showing a schematic configuration of the electrode unit 20 in the present embodiment. The electrode unit 20 includes a first electrode 30 and a second electrode 40. Further, the electrode unit 20 in the present embodiment includes a coil 50.

The first electrode 30 and the second electrode 40 are both electrically coupled to the voltage application unit 80 shown in FIG. 1. In the present embodiment, the first electrode 30 is electrically coupled to the voltage application unit 80 via an electric wire 75, the coil 50, and an internal conductor 70 of a coaxial cable. The second electrode 40 is electrically coupled to the voltage application unit 80 via an external conductor of a coaxial cable (not shown).

The first electrode 30 and the second electrode 40 are conductors, and are made of, for example, a metal, an alloy, or a conductive oxide. The first electrode 30 and the second electrode 40 may be made of the same material or may be made of different materials. The first electrode 30 and the second electrode 40 may be disposed at a substrate made of a material having a low dielectric loss tangent or low electrical conductivity, or the like, or may be supported by other members, for example, for the purpose of maintaining a posture and strength thereof. As shown in FIG. 2, in the present embodiment, the second electrode 40 is supported from above by a support member 60.

The first electrode 30 and the second electrode 40 are disposed such that a shortest distance between the first electrode 30 and the second electrode 40 is equal to or less than one-tenth of a wavelength of an electromagnetic field output from the electrode unit 20. The first electrode 30 in the present embodiment has a boat shape with the X direction as a longitudinal direction and the Y direction as a lateral direction. A lower surface of the first electrode 30 has a curved shape protruding in the −Z direction. The first electrode 30 has an oval shape elongated in the X direction when viewed along the Z direction. The second electrode 40 is flat in the X direction and the Y direction and has an oval ring shape elongated in the X direction. The second electrode 40 is disposed so as to surround the first electrode 30 when viewed along the Z direction.

The first electrode 30 and the second electrode 40 are both disposed at a substrate 110 disposed parallel to the X direction and the Y direction. More specifically, the first electrode 30 is disposed such that a central portion of the lower surface of the first electrode 30 in the X direction and the Y direction is in contact with an upper surface of the substrate 110. The second electrode 40 is disposed such that a lower surface of the second electrode 40 is in contact with the upper surface of the substrate 110. Therefore, in the present embodiment, the central portion of the lower surface of the first electrode 30 and the lower surface of the second electrode 40 are disposed on the same plane.

In the first cover unit 310, both the first electrode 30 and the second electrode 40 face, in a second direction, the object OH to be heated that is conveyed in a first direction by the conveyance unit 200. In the present embodiment, the first direction is the −Y direction. The second direction is a direction intersecting the first direction, and is the −Z direction in the present embodiment. The first electrode 30 and the second electrode 40 are disposed away from the object OH to be heated. That is, in the present embodiment, the first electrode 30 and the second electrode 40 are disposed above the sheet-shaped object OH to be heated such that the lower surface of each electrode faces an upper surface of the object OH to be heated. Accordingly, in the present embodiment, the substrate 110 described above is disposed between the object OH to be heated and the first electrode 30 and the second electrode 40. In other embodiments, the second direction may not be a direction orthogonal to the first direction.

In the present embodiment, the substrate 110 is made of glass. The substrate 110 prevents a liquid such as an ink applied to the object OH to be heated from adhering to the first electrode 30 and the second electrode 40, and prevents a fluff of the object OH to be heated from adhering to the first electrode 30 and the second electrode 40 when the object OH to be heated is cloth. In other embodiments, the substrate 110 may be made of, for example, alumina.

An alternating current voltage is applied to the first electrode 30 and the second electrode 40 by the voltage application unit 80 shown in FIG. 1. The voltage application unit 80 in the present embodiment is formed as a high frequency power supply including a high frequency voltage generating circuit, and outputs a high frequency voltage. The voltage application unit 80 includes, for example, a quartz crystal oscillator, a phase locked loop (PLL) circuit, and a power amplifier. The voltage application unit 80 amplifies a high frequency signal generated in the PLL circuit by the power amplifier and supplies the amplified high frequency signal to the electrode unit 20 via a coaxial cable or the like, thereby applying a high frequency voltage to the first electrode 30 and the second electrode 40. One of potentials applied to the first electrode 30 and the second electrode 40 may be a reference potential. The reference potential is a constant potential serving as a reference of the high frequency voltage, and is, for example, a ground potential. In the present description, the high frequency voltage refers to an alternating current voltage having a frequency of 1 MHz or more.

When an alternating current voltage is applied to the first electrode 30 and the second electrode 40, an electromagnetic field is generated from the first electrode 30 and the second electrode 40. The strength of the electromagnetic field is very strong in the vicinity of the first electrode 30 and the second electrode 40, and is very weak at a far location far away from the first electrode 30 and the second electrode 40. In the present description, an electromagnetic field generated in the vicinity of the first electrode 30 and the second electrode 40 by the application of the alternating current voltage is also referred to as a "vicinity electromagnetic field". The "vicinity" of the first electrode 30 and the second electrode 40 refers to a range where a distance from the first electrode 30 and the second electrode 40 is equal to or less than ½Π of a wavelength of the generated electromagnetic field. A range farther away than the "vicinity" is also referred to as the "far location". In the present description, an electromagnetic field generated at the far location away from the first electrode 30 and the second electrode 40 by the application of the alternating current voltage is also referred to as a "far electromagnetic field". The far electromagnetic field corresponds to an electromagnetic field used for communication by a general communication antenna or the like.

As described above, the first electrode 30 and the second electrode 40 are disposed such that the shortest distance therebetween is equal to or less than one-tenth of the wavelength of the electromagnetic field. Accordingly, an electric field density of the electromagnetic field generated from the first electrode 30 and the second electrode 40 can be attenuated in the vicinity of the first electrode 30 and the second electrode 40. Therefore, by appropriately maintaining the distance between the object OH to be heated and the first electrode 30 and the second electrode 40, it is possible to prevent radiation of the far electromagnetic field from the first electrode 30 and the second electrode 40 while efficiently heating the object OH to be heated by the electric field generated in the vicinity of the first electrode 30 and the second electrode 40. In particular, in the present embodiment, since the second electrode 40 is disposed to surround the first electrode 30 when viewed along the Z direction, the radiation of the far electromagnetic field from the first electrode 30 and the second electrode 40 can be prevented. As long as the second electrode 40 is disposed to surround the first electrode 30 when viewed along the Z direction, the radiation of the far electromagnetic field from the first electrode 30 and the second electrode 40 can be prevented, for example, even when an outer shape of the first electrode 30 and the second electrode 40 when viewed along the Z direction is a circular shape, a rectangular shape, a polygonal shape other than the rectangular shape, or the like.

The electromagnetic field generated from the electrode unit 20 has a wavelength $\lambda_0$ corresponding to a frequency $f_0$ of the alternating current voltage applied to the electrode unit 20 by the voltage application unit 80. Therefore, for example, when the object OH to be heated contains water, a dielectric loss tangent of water is maximized in the vicinity of 20 GHz, and thus the object OH to be heated can be more efficiently heated in the dielectric heating apparatus 100 by applying, to the electrode unit 20, a high frequency voltage of 2.45 GHz or 5.8 GHz among the ISM bands. In addition, from the viewpoint of heating an ink, good heating efficiency can be obtained, even when the frequency $f_0$ is, for example, a low frequency such as 40.68 MHz which is one of the ISM bands. This is because at 40.68 MHz, the dielectric loss tangent of water in the ink is low, but Joule heat generated by a pigment component and the like in the ink as electrical resistance is likely to be generated.

In the present embodiment, one end of the coil 50 is electrically coupled in series to the first electrode 30 via the electric wire 75, and the other end of the coil 50 is electrically coupled in series to the voltage application unit 80. In the present embodiment, the coil 50 includes a solenoid coil, and is disposed such that a length direction thereof is along the Z direction. A shape, a length, a cross-sectional area, the number of turns, a material, and the like of the coil 50 are selected, for example, so as to form a resonance circuit that resonates at the frequency $f_0$ together with the first electrode 30 and the second electrode 40, and so as to implement impedance matching between the electrode unit 20 and the voltage application unit 80.

When the voltage application unit 80 applies an alternating current voltage to the electrode unit 20, a high voltage is generated at the one end of the coil 50. Accordingly, the intensity of the electric field generated from the first electrode 30 and the second electrode 40 can be increased. The coil 50 is preferably disposed such that a distance between the one end of the coil 50 and the first electrode 30 is as small as possible. When the distance between the one end of the coil 50 and the first electrode 30 is long, a high voltage generated at the one end of the coil 50 may generate an electric field that does not contribute to the heating of the object OH to be heated between the coil 50 and the first electrode 30 or between the electric wire 75 and the second electrode 40, and the effect of increasing the intensity of the electric field generated from the first electrode 30 and the second electrode 40 may be deteriorated. On the other hand, since the generation of the electric field that does not contribute to the heating of the object OH to be heated can be prevented by reducing the distance between the one end of the coil 50 and the first electrode 30, the intensity of the electric field generated from the first electrode 30 and the second electrode 40 can be effectively increased. In other embodiments, for example, the first electrode 30 may be formed in a meander shape to cause the first electrode 30 to exhibit the same function as the coil 50.

Figure 3:
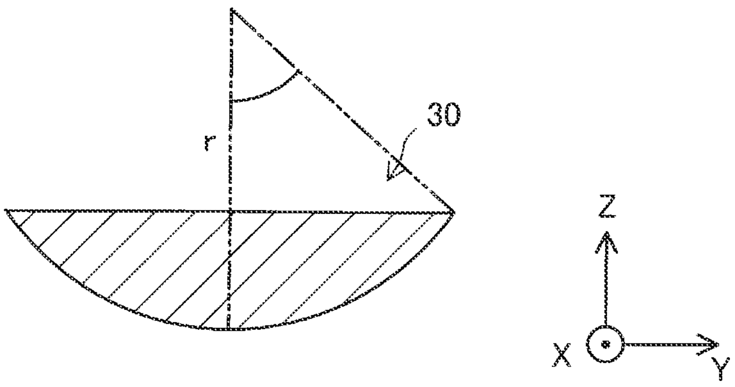
FIG. 3 is a cross-sectional view of a first electrode taken along a line III-III in FIG. 2.
Figure 4:
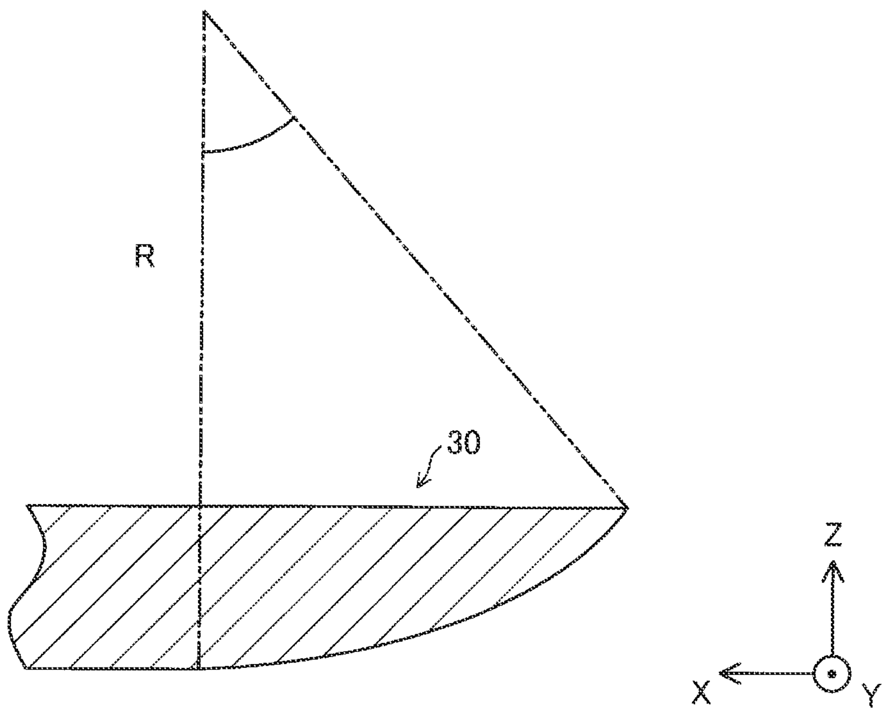
FIG. 4 is a cross-sectional view of the first electrode taken along a line IV-IV in FIG. 2.

FIG. 3 is a cross-sectional view of the first electrode 30 taken along a line III-III in FIG. 2. FIG. 4 is a cross-sectional view of the first electrode 30 taken along a line IV-IV in FIG. 2. As shown in FIGS. 2 and 3, the first electrode 30 has an arc shape protruding in the −Z direction when viewed along the X direction. Similarly, as shown in FIGS. 2 and 4, the first electrode 30 has an arc shape protruding in the −Z direction when viewed along the Y direction. Therefore, an end portion of the first electrode 30 in the longitudinal direction and an end portion of the first electrode 30 in the lateral direction are positioned in the +Z direction with respect to a central portion of the first electrode 30.

The electrode unit 20 preferably has a shape that can prevent a variation in the electric field intensity within the range of the vicinity electromagnetic field. For example, as described with reference to FIGS. 2 to 4, the first electrode 30 in the present embodiment has a rounded shape as a whole with few sharp corners. Accordingly, for example, as compared with a case where the end portion of the first electrode 30 or the like has an angular shape, the concentration of the electric field on a specific portion such as an end portion of the first electrode 30 can be prevented. In the present embodiment, since the first electrode 30 has a boat shape, a distance between the end portion of the first electrode 30 and the object OH to be heated in the Z direction is longer than a distance between the central portion of the first electrode 30 and the object OH to be heated in the Z direction. A curvature radius r of the end portion of the first electrode 30 in the lateral direction shown in FIG. 2 is smaller than a curvature radius R of the end portion of the first electrode 30 in the longitudinal direction shown in FIG. 4. Accordingly, the concentration of the electric field on the end portion of the first electrode 30, in particular, the concentration of the electric field on the end portion of the first electrode 30 in the longitudinal direction can be further prevented. In this way, by preventing the variation in the electric field intensity within the range of the vicinity electromagnetic field, a variation in the electric field intensity within the plane of the object OH to be heated can be prevented, and the heating unevenness of the object OH to be heated can be prevented.

The case unit 300 shown in FIG. 1 blocks a radiation wave from the electrode unit 20 accommodated therein. The radiation wave from the electrode unit 20 refers to an electromagnetic wave radiated from the electrode unit 20. The radiation wave includes, for example, a far electromagnetic field radiated from the first electrode 30 and the second electrode 40 described above and an electromagnetic field generated by the coil 50.

The "blocking of the radiation wave" by the case unit 300 refers to setting, by the case unit 300, an intensity of the electromagnetic field radiated from the electrode unit 20 to the outside of the case unit 300 to a predetermined reference value or less. The reference value is determined based on a regulation value defined in guidelines or the like related to exposure limitation of an electromagnetic field in each country or region. Such guidelines include, for example, radio wave protection guidelines in Japan and guidelines defined by International Committee on Non-Ionization Radiation Protection (ICNIRP). For example, in the guidelines of ICNIRP, an exposure limit value of a magnetic field at a frequency of 40.68 MHz is 0.16 A/m in the case of an occupational exposure and 0.073 A/m in the case of a public exposure. These exposure limit values in the guidelines of ICNIRP are all an average value for 6 minutes.

Figure 5:
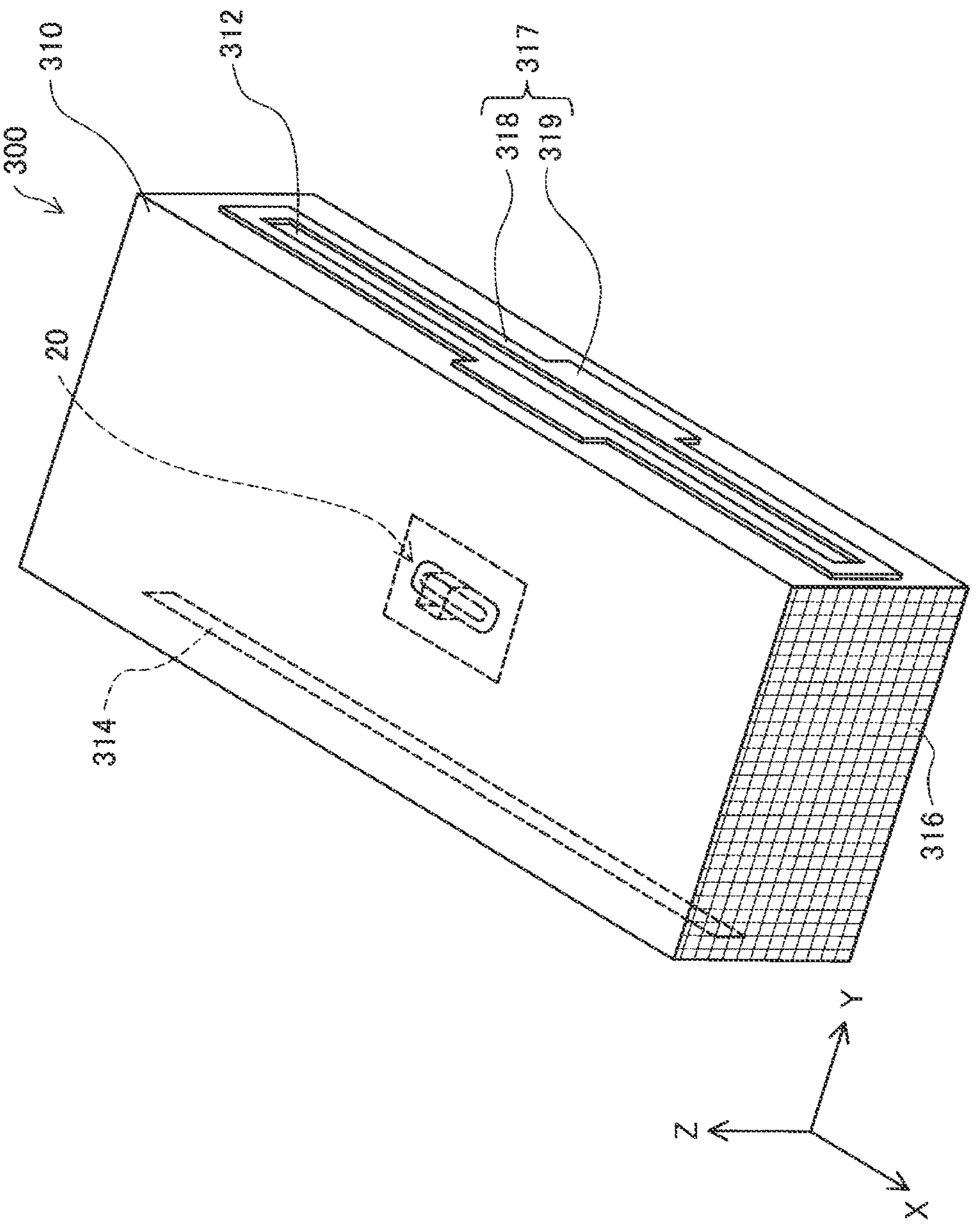
FIG. 5 is a perspective diagram showing a schematic configuration of a first cover unit.

FIG. 5 is a perspective diagram showing a schematic configuration of the first cover unit 310 provided in the case unit 300. The case unit 300 blocks the radiation wave by generating an electromagnetic field due to an eddy current generated in the first cover unit 310 when a radiation wave is radiated from the electrode unit 20. The electromagnetic field weakens the radiation wave from the first cover unit 310. The magnitude of the eddy current generated in the first cover unit 310 when the radiation wave is radiated is proportional to one-half power of an electric conductivity and one-half power of an absolute magnetic permeability of a material constituting the first cover unit 310. Therefore, the material constituting the first cover unit 310 is preferably a material having a high electric conductivity and a high absolute magnetic permeability. The first cover unit 310 in the present embodiment is made of zinc having a relatively high electric conductivity among metal materials.

The first cover unit 310 in the present embodiment has a rectangular parallelepiped outer shape. The first cover unit 310 includes the first insertion port 312, the first feed-out port 314, and a plurality of first opening portions 316. The first insertion port 312 is an opening portion for inserting the object OH to be heated into the first cover unit 310. The first feed-out port 314 is an opening portion for feeding the object OH to be heated in the first cover unit 310 out of the first cover unit 310. In the present embodiment, the first insertion port 312 is provided in a surface of the first cover unit 310 on a +Y direction side, and the first feed-out port 314 is provided in a surface of the first cover unit 310 on a −Y direction side. That is, the first insertion port 312 and the first feed-out port 314 are disposed to face each other in the Y direction with the electrode unit 20 interposed therebetween. The first insertion port 312 and the first feed-out port 314 each have a rectangular opening shape with the X direction as a longitudinal direction and the Z direction as a lateral direction similarly.

The first opening portion 316 is an opening portion that is different from the first insertion port 312 and the first feed-out port 314. More specifically, in the present embodiment, each surface of the first cover unit 310 is formed of a wire mesh obtained by vertically and horizontally plain-weaving a wire material made of zinc, and opening portions separated by the wire material correspond to the first opening portions 316. Accordingly, in the present embodiment, the plurality of first opening portions 316 each having a square opening shape are formed on each surface of the first cover unit 310 so as to be arranged vertically and horizontally in a direction along the surface. In FIG. 5, among the first opening portions 316, only the first opening portions 316 provided in a surface of the first cover unit 310 on a +X direction side are shown, and the first opening portions 316 provided in other surfaces are omitted.

In the present embodiment, an opening area of one first opening portion 316 is smaller than an opening area of the first insertion port 312 and an opening area of the first feed-out port 314. On the other hand, a sum of opening areas of the first opening portions 316 is larger than the opening area of the first insertion port 312 and the opening area of the first feed-out port 314. An opening diameter of the first opening portion 316 is smaller than an opening diameter of the first insertion port 312 and an opening diameter of the first feed-out port 314. In the present description, the opening diameter refers to a maximum length of the opening. For example, in the present embodiment, a length of a diagonal line of the first opening portion 316 corresponds to the opening diameter of the first opening portion 316. In the present embodiment, a length of each side of the first opening portion 316 is shorter than a length of either side of the first insertion port 312 and the first feed-out port 314.

In other embodiments, each surface of the first cover unit 310 may be formed of, for example, a wire mesh obtained by twill weaving a wire material, an expanded metal, or a punched metal. An opening shape of the first opening portion 316 or the like may not be rectangular, and may be, for example, a circular shape, an oval shape, a rhombic shape, or other polygonal shapes. When the opening shape of the first opening portion 316 or the like is, for example, a circular shape, the diameter thereof corresponds to the opening diameter of the first opening portion 316 or the like. The first opening portion 316 may not be provided in all surfaces of the first cover unit 310, and the first opening portion 316 may be provided in only a part of surfaces of the first cover unit 310.

The opening shape, the opening area, the opening diameter, the number, the position, and the like of the first opening portion 316 are preferably determined such that when a radiation wave is radiated from the electrode unit 20, an eddy current is generated in the first cover unit 310 to an extent that an electromagnetic field that weakens the radiation wave is generated. The opening diameter of the first opening portion 316 is preferably set to, for example, one-tenth or less of the wavelength $\lambda_0$ in order to prevent the radiation wave from leaking to the outside of the first cover unit 310 through the first opening portions 316. In the present embodiment, as described above, since the radiation of the far electromagnetic field from the first electrode 30 and the second electrode 40 can be prevented, the opening shape of the first opening portion 316 or the like can be determined by taking this into account. In this case, the weight of the case unit 300 can be reduced by increasing, for example, the opening area, the opening diameter, and the number of the first opening portions 316 within a range where the radiation wave can be prevented from leaking to the outside of the first cover unit 310 through the first opening portions 316.

As shown in FIG. 5, a first edge portion 317 is disposed around the first insertion port 312. The first edge portion 317 is made of an electrically insulating magnetic material, and continuously surrounds the first insertion port 312. In the present embodiment, a Ni—Zn-based soft ferrite material formed in a sheet shape is used as the first edge portion 317. The first edge portion 317 is fixed to an outer surface of the first cover unit 310 via an adhesive so as to surround the first insertion port 312 without interruption. Hereinafter, the first edge portion 317 may be simply referred to as an edge portion. In FIG. 1 described above, the first edge portion 317 is omitted.

In the present embodiment, the first edge portion 317 includes a first portion 318 and a second portion 319. The second portion 319 is a portion of the first edge portion 317 provided at a position corresponding to the electrode unit 20 in the X direction, and has a width larger than that of the first portion 318. The "width" of the edge portion refers to a dimension in a direction perpendicular to a direction along the periphery of the first insertion port 312. More specifically, the second portion 319 is provided so as to sandwich, in the Z direction, a portion of the first insertion port 312 provided in the position corresponding to the electrode unit 20 in the X direction. The first portion 318 and the second portion 319 may be separate bodies or may be integrally formed as long as they are provided in a continuous manner with each other.

The first insertion port 312 may act as a pseudo slot antenna depending on the opening diameter, the opening area, and the like thereof, and an electromagnetic field may be radiated to the outside of the first cover unit 310 through the first insertion port 312. More specifically, the eddy current generated in the first cover unit 310 by the far electromagnetic field radiated from the electrode unit 20 generates an electric field in the first insertion port 312, and thus the first insertion port 312 may act as a pseudo slot antenna. In the present embodiment, as described above, since the first edge portion 317 made of a magnetic material is disposed to surround the first insertion port 312, generation of the eddy current around the first insertion port 312 is prevented. In addition, since the first edge portion 317 has electrical insulation, the eddy current generated due to the far electromagnetic field radiated from the electrode unit 20 is less likely to be generated in the first edge portion 317 itself. Accordingly, the first insertion port 312 can be prevented from acting as a pseudo slot antenna, and the electromagnetic field radiated from the first insertion port 312 to the outside of the first cover unit 310 can be prevented. In the present embodiment, since the first edge portion 317 includes the second portion 319, the generation of the eddy current in a portion around the first insertion port 312, the portion having a shorter distance from the electrode unit 20, is further prevented, and the radiation of the electromagnetic field to the outside of the first cover unit 310 can be more effectively prevented.

In the present embodiment, although not shown, the first edge portion 317 is similarly provided around the first feed-out port 314 so as to continuously surround the first feed-out port 314. The effect of the first edge portion 317 provided around the first feed-out port 314 is the same as the effect of the first edge portion 317 provided around the first insertion port 312 described above.

According to the first embodiment described above, the metal first cover unit 310 that surrounds the electrode unit 20 includes the plurality of first opening portions 316 that are different from the first insertion port 312 and the first feed-out port 314. Accordingly, the vapor generated by heating of the object OH to be heated in the first cover unit 310 can be moved to the outside of the first cover unit 310 through the first opening portions 316, and thus the retention of the vapor in the first cover unit 310 can be prevented. Therefore, it is possible to prevent the liquid generated by condensation of the retained vapor from contaminating the object OH to be heated, and to prevent a decrease in drying efficiency when heating and drying the object OH to be heated. In addition, since the first cover unit 310 includes the first opening portions 316, the first cover unit 310 is lighter as compared with a case where the first cover unit 310 does not include the first opening portions 316. Therefore, the overall weight of the dielectric heating apparatus 100 can be reduced.

According to the present embodiment, the first edge portion 317 that is made of an electrically insulating magnetic material and continuously surrounds at least one of the first insertion port 312 and the first feed-out port 314 is provided. Therefore, the electromagnetic field radiated from the first insertion port 312 or the first feed-out port 314 to the outside of the first cover unit 310 can be prevented by the first edge portion 317.

According to the present embodiment, the first cover unit 310 is made of zinc. Therefore, the weight of the first cover unit 310 can be reduced as compared with a case where the first cover unit 310 is made of, for example, carbon steel or copper. In addition, for example, the strength of the first cover unit 310 can be further increased as compared with a case where the first cover unit 310 is made of aluminum.

B. Second Embodiment

Figure 6:
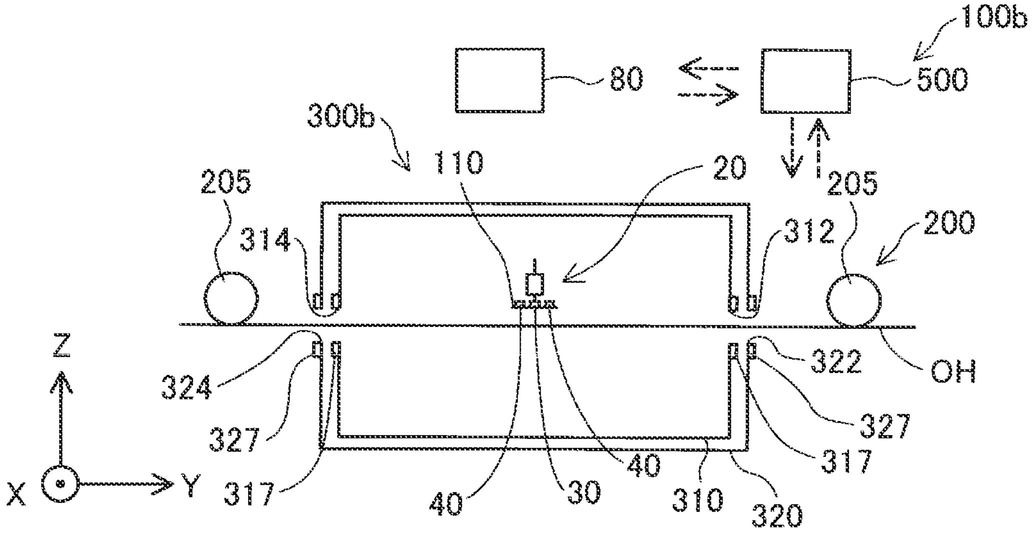
FIG. 6 is a schematic diagram showing a schematic configuration of a dielectric heating apparatus according to a second embodiment.

FIG. 6 is a schematic diagram showing a schematic configuration of a dielectric heating apparatus **100*b* according to a second embodiment. Unlike the first embodiment, a case unit 300*b* in the present embodiment includes the first cover unit 310 and a metal second cover unit 320 that surrounds the first cover unit 310. Portions of the configuration of the dielectric heating apparatus 100***b*, which are not particularly described, are the same as those of the first embodiment.

Figure 7:
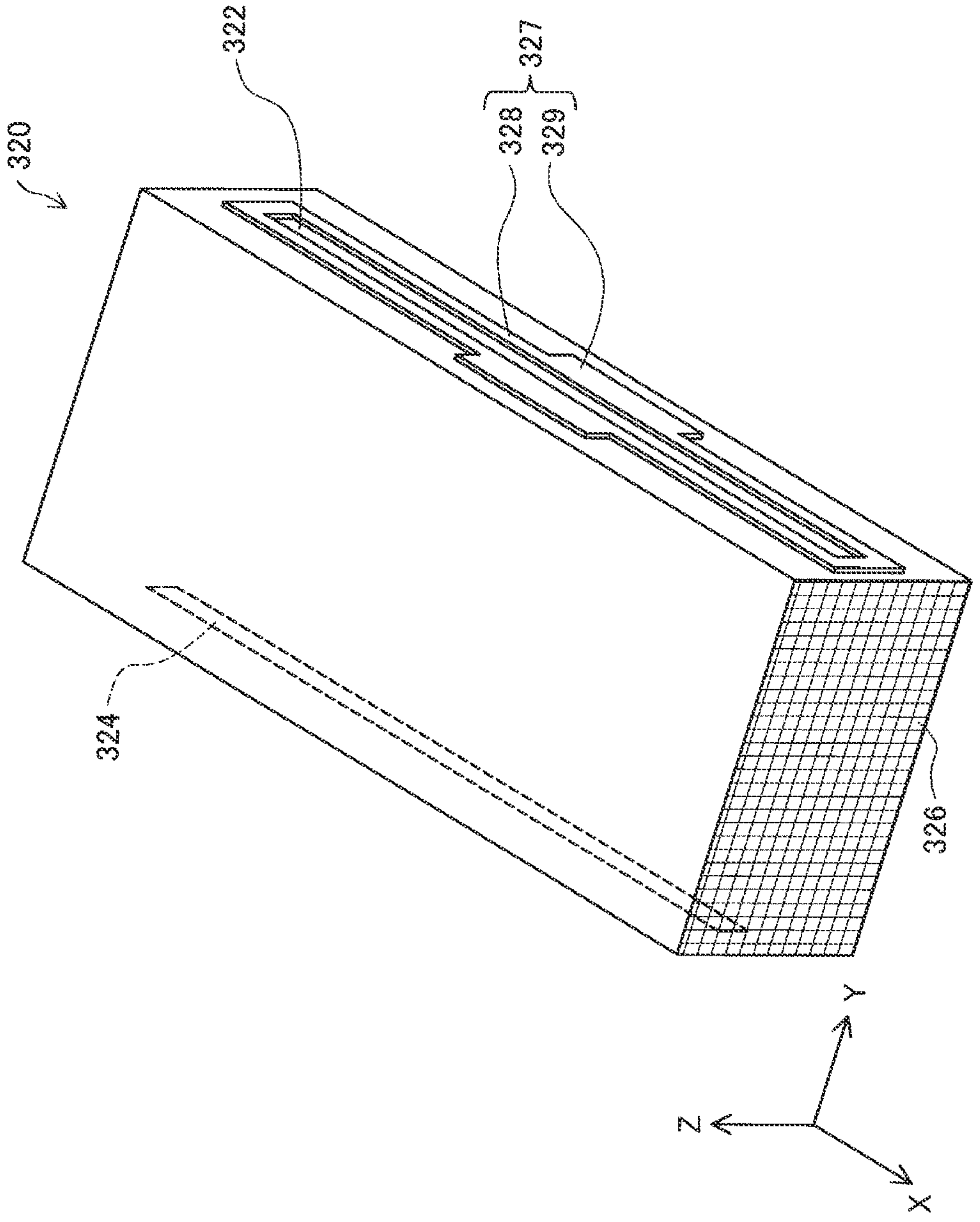
FIG. 7 is a perspective diagram showing a schematic configuration of a second cover unit.

FIG. 7 is a perspective diagram showing a schematic configuration of the second cover unit 320. The second cover unit 320 in the present embodiment is made of zinc and has a rectangular parallelepiped shape. External dimensions of the second cover unit 320 in the X, Y, and Z directions are larger than external dimensions of the first cover unit 310 in the X, Y, and Z directions.

As shown in FIGS. 6 and 7, the second cover unit 320 includes a second insertion port 322, a second feed-out port 324, and a plurality of second opening portions 326. In FIG. 6, the second opening portion 326 is omitted. The second insertion port 322 is an opening portion for inserting the object OH to be heated into the second cover unit 320. The second feed-out port 324 is an opening portion for feeding the object OH to be heated in the second cover unit 320 out of the second cover unit 320. As shown in FIG. 6, the second insertion port 322 is provided in a surface of the second cover unit 320 on a +Y direction side, and the second feed-out port 324 is provided in a surface of the second cover unit 320 on a −Y direction side. More specifically, the second insertion port 322 is provided in a position corresponding to the first insertion port 312, and the second feed-out port 324 is provided in a position corresponding to the first feed-out port 314. In the present embodiment, the second insertion port 322 and the second feed-out port 324 have an opening shape and dimensions the same as those of the first insertion port 312 and the second feed-out port 324, respectively.

In the present embodiment, the object OH to be heated is first inserted into the second cover unit 320 through the second insertion port 322. Thereby, the object OH to be heated is inserted into the case unit 300*b*. Next, the object OH to be heated is inserted into the first cover unit 310 through the first insertion port 312. Then, the object OH to be heated is heated by the electrode unit 20 in the first cover unit 310, and then is fed out of the first cover unit 310 through the first feed-out port 314. Next, the object OH to be heated is fed out of the second cover unit 320 through the second feed-out port 324. Thereby, the object OH to be heated is fed out of the case unit 300*b*.

The second opening portion 326 shown in FIG. 7 is an opening portion that is different from the second insertion port 322 and the second feed-out port 324. More specifically, similar to each surface of the first cover unit 310, each surface of the second cover unit 320 is formed of a wire mesh obtained by vertically and horizontally plain-weaving a wire material made of zinc, and opening portions separated by the wire material corresponds to the second opening portions 326. The second opening portion 326 in the present embodiment has an opening shape and dimensions same as those of the first opening portion 316. As described above, since the external dimensions of the second cover unit 320 are larger than the external dimensions of the first cover unit 310, a sum of opening areas of the second opening portions 326 is larger than a sum of opening areas of the first opening portions 316. In FIG. 7, among the second opening portions 326, only the second opening portions 326 provided in a surface of the second cover unit 320 on the +X direction side are shown, and the second opening portions 326 provided in other surfaces are omitted.

As shown in FIG. 7, a second edge portion 327 is disposed around the second insertion port 322. The second edge portion 327 is made of an electrically insulating magnetic material, and continuously surrounds the second insertion port 322. In the present embodiment, a Ni—Zn-based soft ferrite material formed in a sheet shape is used as the second edge portion 327, similar to the first edge portion 317. The second edge portion 327 is fixed to an outer surface of the second cover unit 320 via an adhesive so as to surround the second insertion port 322 without interruption.

In the present embodiment, the second edge portion 327 includes a third portion 328 and a fourth portion 329. The fourth portion 329 is a portion of the second edge portion 327 provided at a position corresponding to the electrode unit 20 in the X direction, and has a width larger than that of the third portion 328. The configuration of the third portion 328 is the same as the configuration of the first portion 318 of the first edge portion 317, and the configuration of the fourth portion 329 is the same as the configuration of the second portion 319 of the first edge portion 317. The second edge portion 327 prevents radiation of an electromagnetic field to the outside of the second cover unit 320, similar to the first edge portion 317 preventing the radiation of the electromagnetic field to the outside of the first cover unit 310. As shown in FIG. 6, the second edge portion 327 is also provided around the second feed-out port 324 so as to continuously surround the second feed-out port 324.

According to the second embodiment described above, the metal second cover unit 320 that surrounds the first cover unit 310 is provided, and the second cover unit 320 includes the plurality of second opening portions 326 that are different from the second insertion port 322 and the second feed-out port 324. Accordingly, a radiation wave from the electrode unit 20 can be prevented not only by the first cover unit 310 but also by the second cover unit 320, so that a radiation wave having a higher intensity can be blocked by the case unit 300*b* as a whole as compared with a case without the second cover unit 320. Therefore, for example, a high voltage can be applied to the electrode unit 20, and the heating efficiency of the object OH to be heated can be further increased.

According to the present embodiment, the sum of the opening areas of the second opening portions 326 is larger than the sum of the opening areas of the first opening portions 316. Accordingly, as compared with a case where the sum of the opening areas of the second opening portions 326 is equal to or smaller than the sum of the opening areas of the first opening portions 316, the retention of a vapor in the second cover unit 320 can be further prevented and the weight of the second cover unit 320 can be reduced.

In other embodiments, the second insertion port 322 and the second feed-out port 324 may not be provided in positions corresponding to the first insertion port 312 and the first feed-out port 314. For example, when the object OH to be heated that is inserted into the first cover unit 310 in the −Y direction through the second insertion port 322 and the first insertion port 312 is fed out of the first cover unit 310 through the first feed-out port 314, and then is fed out of the second cover unit 320 by changing the direction of the object OH to be heated so as to be folded back in the second cover unit 320 in the +Y direction, the second feed-out port 324 may be provided in a surface of the second cover unit 320 facing the first insertion port 312. That is, in this case, both the second insertion port 322 and the second feed-out port 324 may be provided in the surface of the second cover unit 320 on the +Y direction side.

C. Third Embodiment

Figure 8:
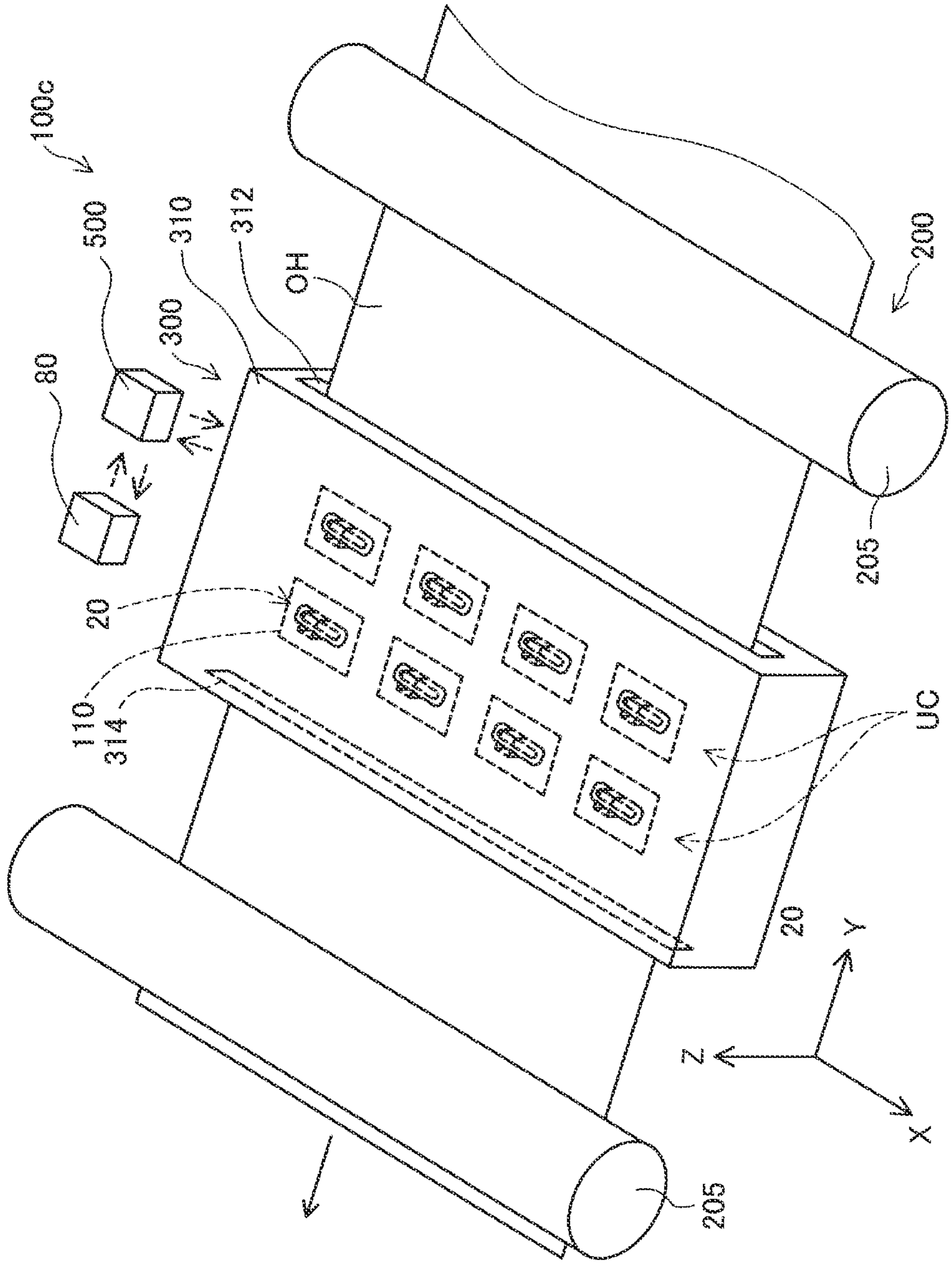
FIG. 8 is a perspective diagram showing a schematic configuration of a dielectric heating apparatus according to a third embodiment.

FIG. 8 is a perspective diagram showing a schematic configuration of a dielectric heating apparatus 100*c* according to a third embodiment. Unlike the first embodiment, the dielectric heating apparatus 100*c* includes a plurality of electrode units 20. Portions of the configuration of the dielectric heating apparatus 100*c*, which are not particularly described, are the same as those of the first embodiment. In FIG. 8, the first edge portion 317 is omitted as in FIG. 1 described in the first embodiment.

The plurality of electrode units 20 are arranged side by side in a third direction intersecting the first direction and orthogonal to the second direction. The third direction includes both one side direction and an opposite direction along the same axis, and is a direction along the X-axis in the present embodiment.

The dielectric heating apparatus 100*c* in the present embodiment includes two columns of unit columns UC. The unit columns UC each include four electrode units 20 arranged side by side in the X direction. That is, the dielectric heating apparatus 100*c* includes a total of eight electrode units 20. The unit columns UC are arranged side by side in the Y direction.

As shown in FIG. 8, in the present embodiment, eight substrates 110 are provided corresponding to the respective electrode units 20. In other embodiments, for example, the substrate 110 may be provided in common for the plurality of electrode units 20, for example, only one substrate 110 may be provided for all of the electrode units 20.

In the present embodiment, alternating current voltages whose phases are inverted by 180° are applied to the electrode units 20 adjacent to each other in the X direction and the Y direction. Accordingly, radiation waves from the adjacent electrode units 20 can be weakened to each other, so that the radiation waves can be blocked by the case unit 300 and the heating efficiency of the object OH to be heated can be further increased, for example, even when a higher voltage is applied to each electrode unit 20. In other embodiments, for example, alternating current voltages having inverted phases may be applied to the electrode units 20 adjacent to each other in the X direction, and alternating current voltages having the same phase may be applied to the electrode units 20 adjacent to each other in the Y direction. Even in this case, the radiation waves from the electrode units 20 to which the alternating current voltages having inverted phases are applied can also be mutually weakened.

According to the third embodiment described above, the plurality of electrode units 20 are provided, and the plurality of electrode units 20 are arranged side by side in the X direction. Therefore, for example, even in the case of heating the object OH to be heated that has a larger dimension in the X direction, the object OH to be heated can be efficiently heated by the plurality of electrode units 20 while being conveyed in the −Y direction. In addition, for example, even when the voltage applied every one of the electrode units 20 is reduced, a sufficient output to heat the object OH to be heated can be easily obtained with the plurality of electrode units 20 as a whole. Therefore, by reducing the voltage applied every one of the electrode units 20, Joule heat generated by parasitic resistance of the electrode unit 20 can be prevented, and concentration of an electric field when an alternating current voltage is applied to the electrode unit 20 can be prevented.

In other embodiments, the number of unit columns UC may not be two, and may be, for example, one or three or more. The number of electrode units 20 provided in one unit column UC may not be four, and may be, for example, two, three, or five or more. In addition, the number of electrode units 20 provided in each unit column UC may be different from each other.

D. Fourth Embodiment

Figure 9:
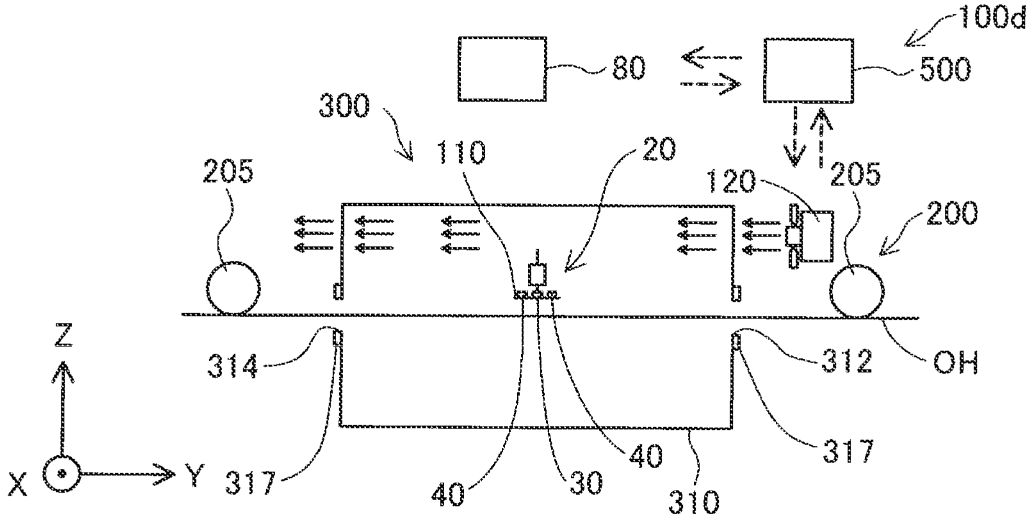
FIG. 9 is a schematic diagram showing a schematic configuration of a dielectric heating apparatus according to a fourth embodiment.

FIG. 9 is a schematic diagram showing a dielectric heating apparatus 100*d* according to a fourth embodiment. Unlike the first embodiment, the dielectric heating apparatus 100*d* includes an airflow generation unit 120 that generates an airflow in the first cover unit 310. Portions of the configuration of the dielectric heating apparatus 100*d*, which are not particularly described, are the same as those of the first embodiment. In FIG. 9, the first opening portion 316 provided in the first cover unit 310 is omitted.

The airflow generation unit 120 in the present embodiment includes a blower fan. The airflow generation unit 120 is disposed in the +Y direction of the first cover unit 310, and blows air toward the first cover unit 310. Accordingly, a gas sent from the airflow generation unit 120 is supplied into the first cover unit 310 through the first opening portions 316 shown in FIG. 5, and an airflow is generated in the first cover unit 310. In particular, in the present embodiment, since the first opening portions 316 are provided in each surface of the first cover unit 310, the inside and outside of the first cover unit 310 can be more efficiently ventilated by the airflow generated in the first cover unit 310. In other embodiments, the airflow generation unit 120 may include a suction fan, a duct, or the like for sucking and discharging the gas in the first cover unit 310 to the outside. In addition, the airflow generation unit 120 may not be disposed in the +Y direction of the first cover unit 310, and may be disposed, for example, in an upper portion of the first cover unit 310.

According to the fourth embodiment described above, the dielectric heating apparatus 100*d* includes the airflow generation unit 120 that generates an airflow in the first cover unit 310. Therefore, by generating the airflow in the first cover unit 310 by the airflow generation unit 120, the inside and outside of the first cover unit 310 can be efficiently ventilated. Therefore, it is possible to further prevent a vapor generated by heating of the object OH to be heated from retaining in the first cover unit 310.

E. Fifth Embodiment

Figure 10:
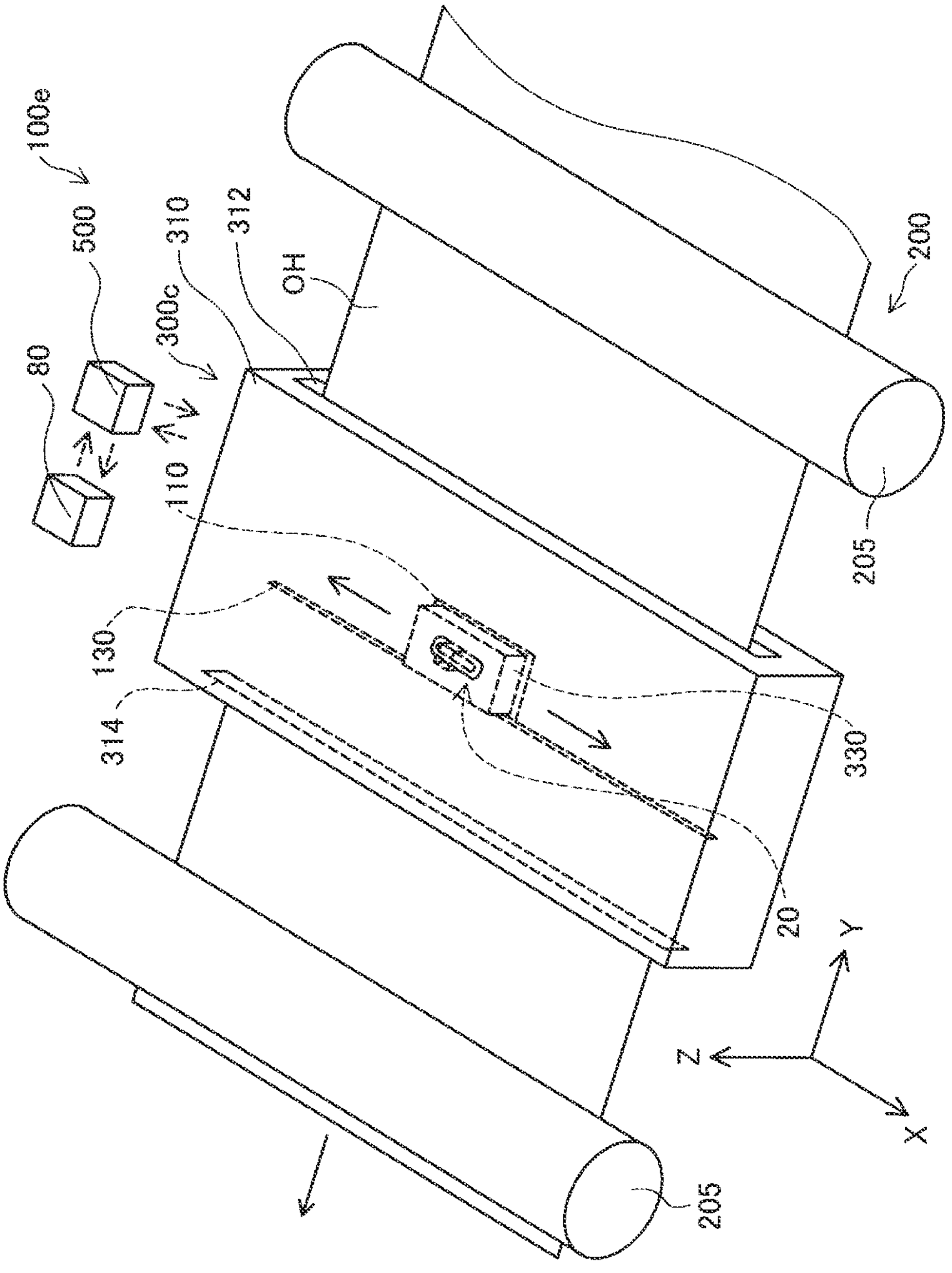
FIG. 10 is a perspective diagram showing a schematic configuration of a dielectric heating apparatus according to a fifth embodiment.
Figure 11:
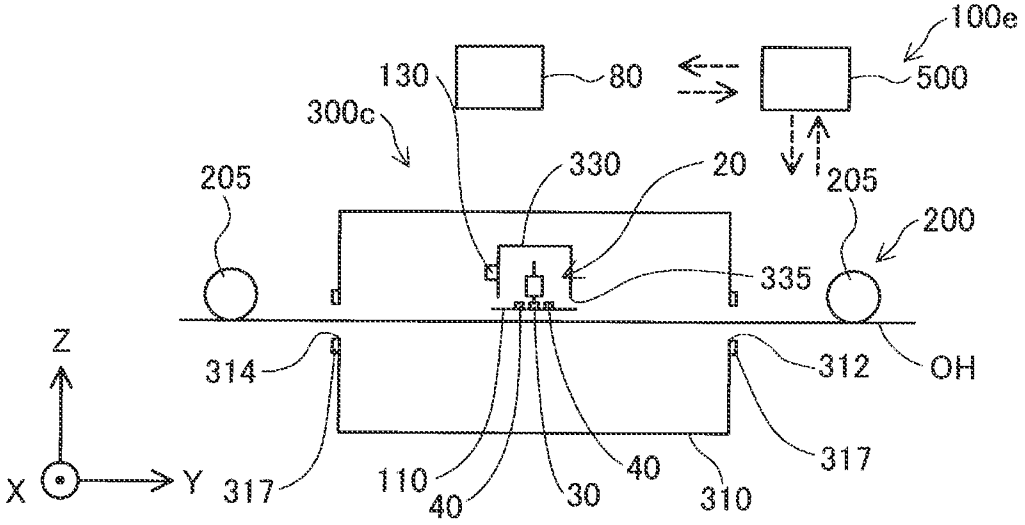
FIG. 11 is a schematic diagram showing the schematic configuration of the dielectric heating apparatus according to the fifth embodiment.

FIG. 10 is a perspective diagram showing a schematic configuration of a dielectric heating apparatus 100*e* according to a fifth embodiment. FIG. 11 is a schematic diagram showing the schematic configuration of the dielectric heating apparatus 100*e* according to the fifth embodiment. Unlike the first embodiment, the dielectric heating apparatus 100*e* includes a movement unit 130. In addition, a case unit 300*c* in the present embodiment includes the first cover unit 310 and a third cover unit 330. Portions of the configuration of the dielectric heating apparatus 100*e*, which are not particularly described, are the same as those of the first embodiment. In FIG. 10, the first edge portion 317 is omitted as in FIG. 1 described in the first embodiment. In FIG. 11, the first opening portion 316 is omitted.

The third cover unit 330 is disposed in the first cover unit 310. The third cover unit 330 is a metal member that covers the electrode unit 20 and faces, in the −Z direction, the object OH to be heated that is conveyed in the −Y direction. The third cover unit 330 has a third opening portion 335 that is opened toward the object OH to be heated in the −Z direction. The third opening portion 335 surrounds at least the first electrode 30 and the second electrode 40 when viewed along the Z direction. In the present embodiment, the third cover unit 330 has a rectangular parallelepiped outer shape as a whole, and the third opening portion 335 is formed as an opening portion having a rectangular opening shape over the entire lower surface of the third cover unit 330. The third cover unit 330 in the present embodiment is made of zinc, similar to the first cover unit 310. Outer dimensions of the third cover unit 330 in the X, Y, and Z directions are smaller than outer dimensions of the first cover unit 310 in the X, Y, and Z directions. In FIG. 11, in order to facilitate understanding of the configuration, the third cover unit 330 and the substrate 110 are separated from each other, but actually, the lower end of the third cover unit 330 and the upper surface of the substrate 110 are in contact with each other.

Figure 12:
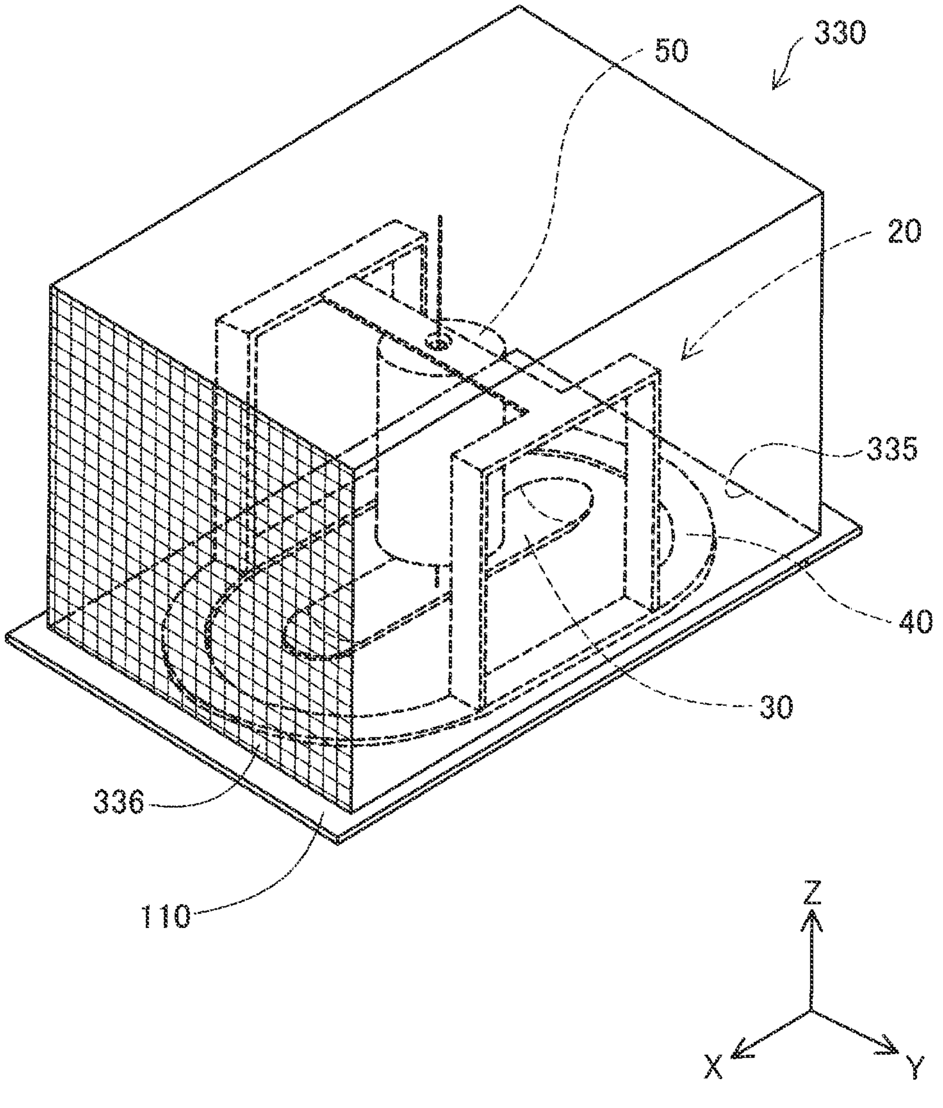
FIG. 12 is a perspective diagram showing a schematic configuration of a third cover unit.

FIG. 12 is a perspective diagram showing a schematic configuration of the third cover unit 330. As shown in FIG. 12, the third cover unit 330 has a plurality of fourth opening portions 336. The fourth opening portion 336 is an opening portion that is different from the third opening portion 335. More specifically, similar to each surface of the first cover unit 310, each surface of the third cover unit 330 except for the lower surface is formed of a wire mesh obtained by vertically and horizontally plain-weaving a wire material made of zinc, and opening portions separated by the wire material corresponds to the fourth opening portions 336. The fourth opening portion 336 in the present embodiment has dimensions and a shape the same as those of the first opening portion 316. That is, in the present embodiment, an opening area of the fourth opening portion 336 is smaller than an opening area of the first insertion port 312 and an opening area of the first feed-out port 314. An opening diameter of the fourth opening portion 336 is smaller than an opening diameter of the first insertion port 312 and an opening diameter of the first feed-out port 314. In FIG. 12, among the fourth opening portions 336, only the fourth opening portions 336 provided in a surface of the third cover unit 330 on the +X direction side are shown, and the fourth opening portions 336 provided in other surfaces are omitted. In FIGS. 10 and 11 described above, the fourth opening portion 336 is omitted.

The movement unit 130 shown in FIGS. 10 and 11 is configured to reciprocate the electrode unit 20 in a fourth direction. The fourth direction is a direction intersecting the first direction and orthogonal to the second direction. The fourth direction includes both one side direction and an opposite direction along the same axis, and is a direction along the X-axis in the present embodiment. The third cover unit 330 is configured to move in the X direction together with the electrode unit 20 by the movement unit 130.

The movement unit 130 includes, for example, a support portion that supports the electrode unit 20 and the third cover unit 330, and a drive unit that moves the support portion along the X direction. The support portion may directly support both the electrode unit 20 and the third cover unit 330, or may directly support only the third cover unit 330 when the third cover unit 330 is fixed to the electrode unit 20, for example. For example, the drive unit may include a belt mechanism having an endless belt and a pulley, or may include a ball screw mechanism having a ball screw and a motor.

According to the fifth embodiment described above, the dielectric heating apparatus 100*e* includes the movement unit 130 configured to reciprocate the electrode unit 20 in the X direction. Therefore, for example, even in the case of heating the object OH to be heated that has a larger dimension in the X direction, the object OH to be heated can be efficiently heated by the electrode unit 20, that is reciprocated in the X direction, while being conveyed in the −Y direction. Therefore, for example, even when a plurality of electrode units 20 are not provided, the object OH to be heated that has a larger dimension in the X direction can be efficiently heated.

Further, in the present embodiment, the metal third cover unit 330 that is disposed in the first cover unit 310, covers the electrode unit 20, and faces, in the −Z direction, the object OH to be heated that is conveyed in the −Y direction is provided. The third cover unit 330 is configured to reciprocate in the X direction together with the electrode unit 20, and includes the third opening portion 335 that is opened toward the object OH to be heated in the −Z direction and surrounds the first electrode 30 and the second electrode 40 when viewed along the Z direction, and the plurality of fourth opening portions 336 that are different from the third opening portion 335. Accordingly, a radiation wave from the electrode unit 20 can be prevented not only by the first cover unit 310 but also by the third cover unit 330, so that a radiation wave having a higher intensity can be blocked by the case unit 300 as a whole as compared with a case where the third cover unit 330 is not provided. In addition, since the third cover unit 330 is configured to reciprocate in the X direction together with the electrode unit 20, weight reduction and cost reduction of the dielectric heating apparatus 100*e* can be implemented by setting the dimension of the third cover unit 330 in the X direction to a dimension sufficient to accommodate the electrode unit 20, for example, as compared with a case where the electrode unit 20 is accommodated in a metal cover having a dimension corresponding to a movement range of the electrode unit 20. Further, since the third cover unit 330 is provided with the plurality of fourth opening portions 336, it is possible to prevent a vapor generated by the heating of the object OH to be heated from retaining in the third cover unit 330.

F. Sixth Embodiment

Figure 13:
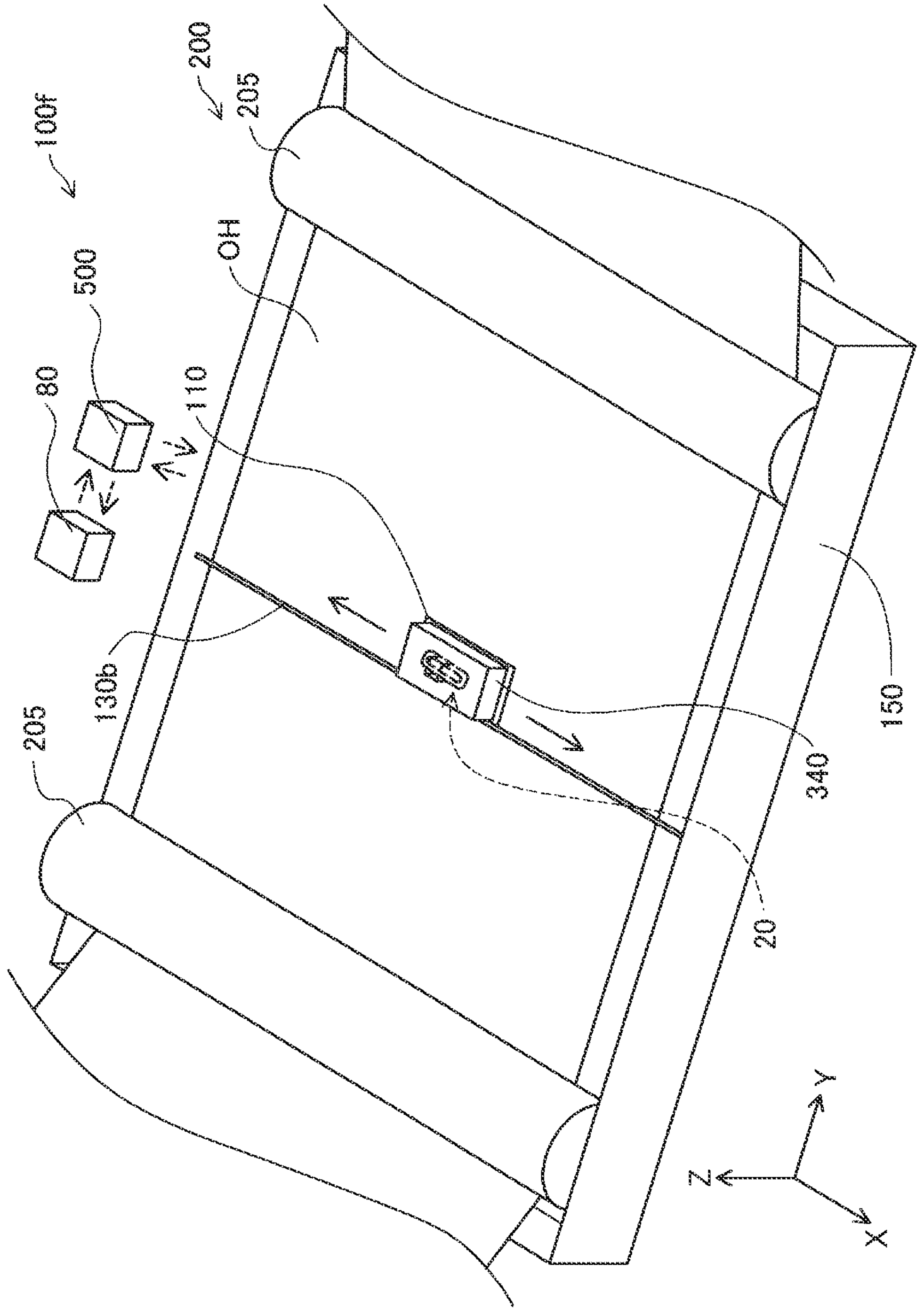
FIG. 13 is a perspective diagram showing a schematic configuration of a dielectric heating apparatus according to a sixth embodiment.
Figure 14:
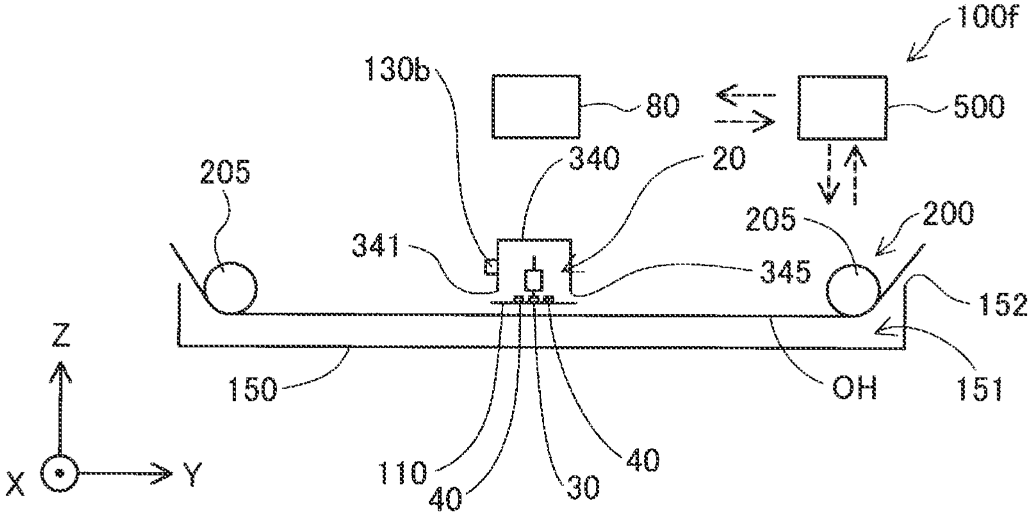
FIG. 14 is a schematic diagram showing the schematic configuration of the dielectric heating apparatus according to the sixth embodiment.

FIG. 13 is a perspective diagram showing a schematic configuration of a dielectric heating apparatus 100*f* according to a sixth embodiment. FIG. 14 is a schematic diagram showing the schematic configuration of the dielectric heating apparatus 100*f* according to the sixth embodiment. Unlike the first embodiment, the dielectric heating apparatus 100*f* does not include the case unit 300, i.e., the first cover unit 310, but includes a movement unit 130*b*, a fourth cover unit 340, and a facing unit 150. Portions of the configuration of the dielectric heating apparatus 100*f*, which are not particularly described, are the same as those of the first embodiment.

The fourth cover unit 340 is a metal member that covers the electrode unit 20 and faces, in the −Z direction, the object OH to be heated that is conveyed in the −Y direction. The fourth cover unit 340 has a fifth opening portion 345 that is opened toward the object OH to be heated in the −Z direction. The fifth opening portion 345 surrounds at least the first electrode 30 and the second electrode 40 when viewed along the Z direction. In the present embodiment, the fourth cover unit 340 has a rectangular parallelepiped outer shape as a whole, and the fifth opening portion 345 is formed as an opening portion having a rectangular opening shape extending over the entire lower surface of the fourth cover unit 340. The fourth cover unit 340 may be made of, for example, zinc, similar to the first cover unit 310 described in the first embodiment or the like, or may be made of carbon steel, aluminum, stainless steel, copper, alloys of various metals, or the like. In addition, all or a part of surfaces of the fourth cover unit 340 may be formed of, for example, a wire mesh, and have a plurality of opening portions, similar to the first cover unit 310.

The movement unit 130*b* is configured to reciprocate the electrode unit 20 in a fifth direction. The fifth direction is a direction intersecting the first direction and orthogonal to the second direction. The fifth direction includes both one side direction and an opposite direction along the same axis, and is a direction along the X-axis in the present embodiment. The fourth cover unit 340 is configured to move in the X direction together with the electrode unit 20 by the movement unit 130*b*. The movement unit 130*b* includes a support portion that supports the electrode unit 20 and the fourth cover unit 340, and a drive unit that moves the support portion along the X direction. The support portion and the drive unit are configured in the same manner as, for example, the support portion and the drive unit of the movement unit 130 described in the fifth embodiment.

The facing unit 150 is a metal member that faces, in the Z direction, the first electrode 30 and the second electrode 40 with the object OH to be heated interposed therebetween. The facing unit 150 in the present embodiment has a recessed portion 151 that is opened in the +Z direction, which is an opposite direction with respect to the −Z direction. As shown in FIG. 14, a lower end 341 of the fourth cover unit 340 is disposed in the opening of the recessed portion 151. It can also be said that the lower end 341 of the fourth cover unit 340 is located below an upper end 152 of an inner wall portion of the opening of the recessed portion 151. The opening of the recessed portion 151 in the present embodiment has a dimension larger than the movement range of the fourth cover unit 340 in the X direction. Accordingly, the movement unit 130*b* can reciprocate the fourth cover unit 340 and the electrode unit 20 in the X direction while keeping the lower end 341 of the fourth cover unit 340 in the recessed portion 151.

According to the sixth embodiment described above, the dielectric heating apparatus 100*f* includes the movement unit 130*b* configured to reciprocate the electrode unit 20 in the X direction, the metal fourth cover unit 340 that covers the electrode unit 20, and faces, in the −Z direction, the object OH to be heated that is conveyed in the −Y direction, and the metal facing unit 150 that faces, in the Z direction, the first electrode 30 and the second electrode 40 with the object OH to be heated that is conveyed in the −Y direction interposed therebetween. The fourth cover unit 340 is configured to reciprocate in the X direction together with the electrode unit 20, and has the fifth opening portion 345 that is opened toward the object OH to be heated in the −Z direction and surrounds the first electrode 30 and the second electrode 40 when viewed along the Z direction. Accordingly, even without providing a casing for heating the object OH to be heated while preventing leakage of the radiation wave from the electrode unit 20, the object OH to be heated can be heated by the electrode unit 20 while the radiation wave can be blocked by the fourth cover unit 340 and the facing unit 150. Therefore, the retention of a vapor generated by the heating of the object OH to be heated can be prevented. Accordingly, it is possible to prevent the liquid generated by condensation of the retained vapor from contaminating the object OH to be heated, and to prevent a decrease in drying efficiency when the object OH to be heated is dried by heating.

Further, in the present embodiment, the facing unit 150 includes the recessed portion 151 that is opened in the +Z direction, and the lower end 341 of the fourth cover unit 340 is disposed in the opening of the recessed portion 151. Accordingly, as compared with a case where the lower end 341 of the fourth cover unit 340 is disposed outside the opening of the recessed portion 151, a radiation wave having a higher intensity can be blocked by the fourth cover unit 340 and the facing unit 150. Therefore, for example, a higher voltage can be applied to the electrode unit 20, and the heating efficiency of the object OH to be heated can be further increased.

G. Seventh Embodiment

Figure 15:
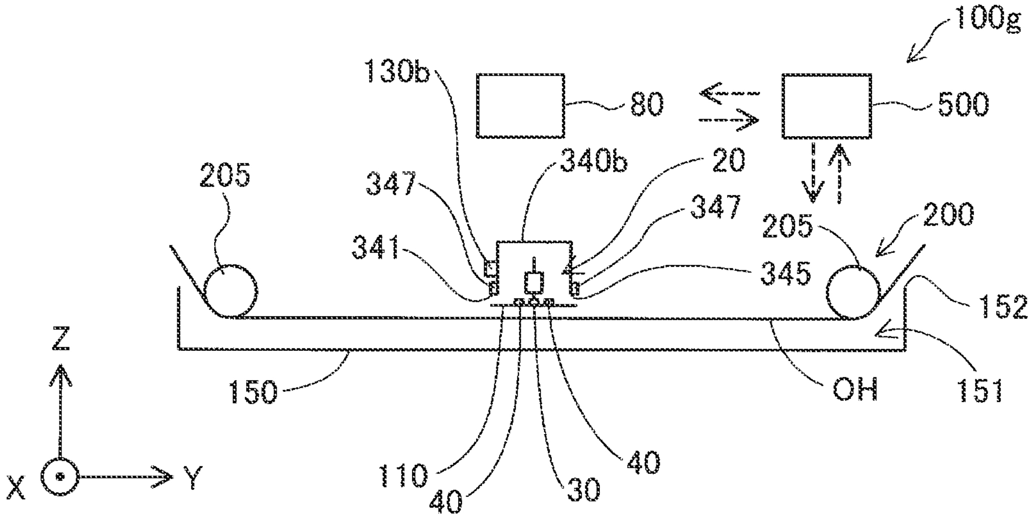
FIG. 15 is a schematic diagram showing a schematic configuration of a dielectric heating apparatus according to a seventh embodiment.
Figure 16:
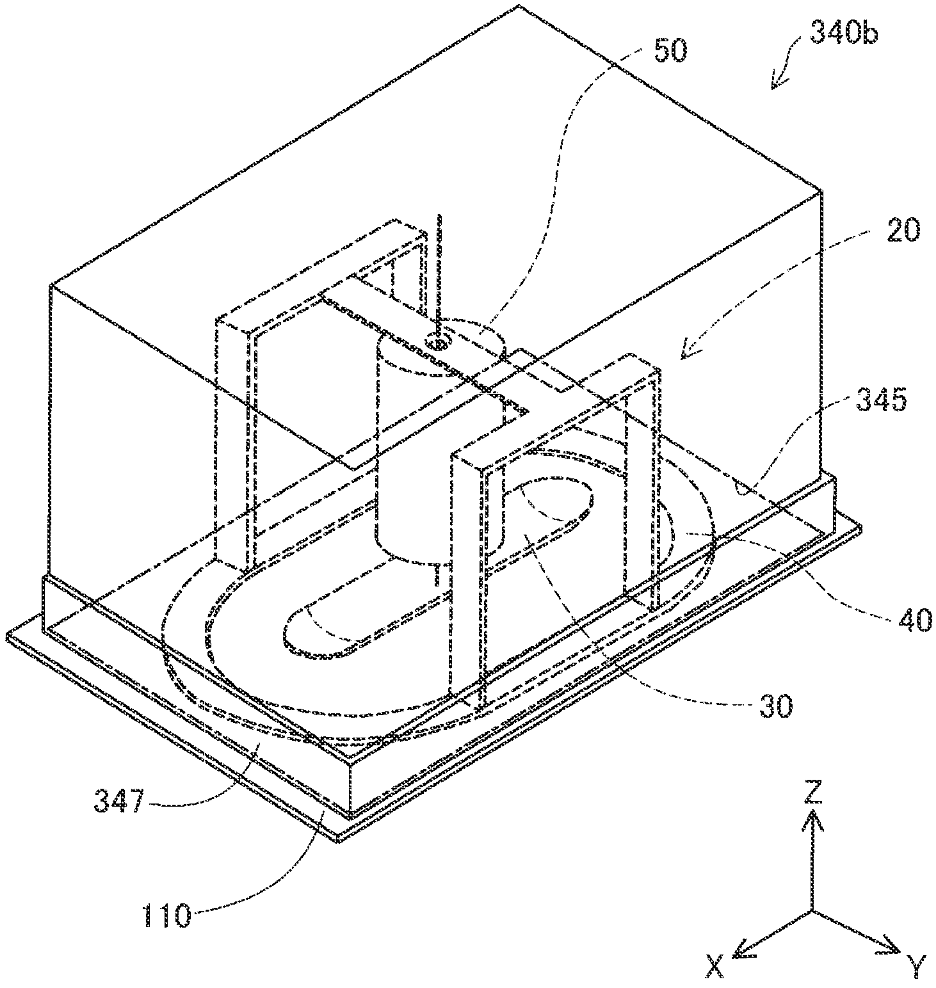
FIG. 16 is a perspective diagram showing a schematic configuration of a fourth cover unit according to the seventh embodiment.

FIG. 15 is a schematic diagram showing a dielectric heating apparatus 100*g* according to a seventh embodiment. FIG. 16 is a perspective diagram showing a schematic configuration of a fourth cover unit 340*b* according to the seventh embodiment. Unlike the sixth embodiment, the dielectric heating apparatus 100*g* according to the present embodiment includes a fourth edge portion 347 that continuously surrounds the fifth opening portion 345 of the fourth cover unit 340*b*. Portions of the configuration of the dielectric heating apparatus 100*g* in the present embodiment, which are not particularly described, are the same as those in the sixth embodiment.

The fourth edge portion 347 is made of an electrically insulating magnetic material. In the present embodiment, a Ni—Zn-based soft ferrite material formed in a sheet shape is used as the fourth edge portion 347, similar to the first edge portion 317. The fourth edge portion 347 is fixed to an outer surface of the lower end 341 of the fourth cover unit 340*b* via an adhesive so as to surround the fifth opening portion 345 without interruption. In other embodiments, for example, the fourth edge portion 347 may be fixed to an inner surface of the lower end 341, or may be fixed to both outer and inner surfaces of the lower end 341.

According to the seventh embodiment described above, the fourth edge portion 347 is disposed around the fifth opening portion 345 of the fourth cover unit 340*b*, and the fourth edge portion 347 is made of a magnetic material having an electric conductivity lower than that of the metal forming the fourth cover unit 340*b*. Accordingly, similar to the case where the first edge portion 317 described in the first embodiment prevents the electromagnetic field radiated from the first insertion port 312 to the outside of the first cover unit 310, the fourth edge portion 347 can prevent the electromagnetic field radiated from the fifth opening portion 345 to the outside of the fourth cover unit 340*b*.

H. Eighth Embodiment

Figure 17:
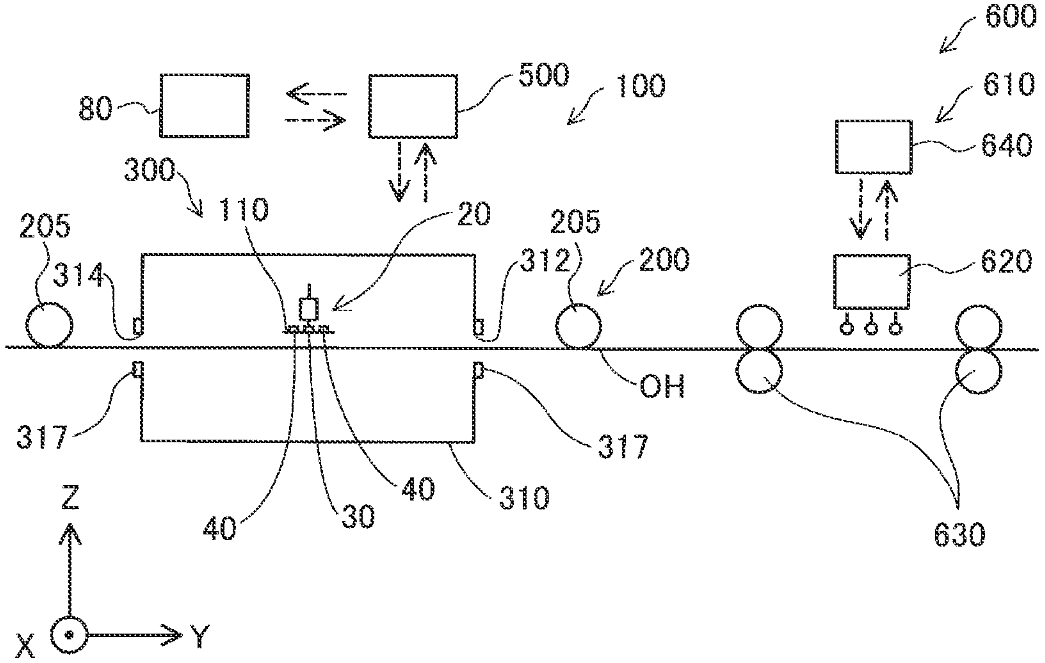
FIG. 17 is a schematic diagram showing a schematic configuration of a printing system according to an eighth embodiment.

FIG. 17 is a diagram showing a schematic configuration of a printing system 600 according to an eighth embodiment. The printing system 600 includes the dielectric heating apparatus 100 described in the first embodiment and a liquid discharge device 610.

The liquid discharge device 610 according to the present embodiment is configured as an inkjet printer, and includes a liquid discharge unit 620 that discharges a liquid onto a printing medium, a medium conveyance unit 630 that conveys the printing medium, and a discharge control unit 640 that controls the liquid discharge unit 620 and the medium conveyance unit 630. The liquid discharge unit 620 includes, for example, a piezo-type or thermal-type liquid discharge head. The medium conveyance unit 630 includes, for example, a roller, similar to the conveyance unit 200. The discharge control unit 640 includes, for example, a computer, similar to the control unit 500 of the dielectric heating apparatus 100. The discharge control unit 640 controls the liquid discharge unit 620 and the medium conveyance unit 630 such that the liquid is discharged and adhered to the printing medium while the printing medium is being conveyed.

As described in the first embodiment, the dielectric heating apparatus 100 heats, as the object OH to be heated, the printing medium on which the liquid discharged by the liquid discharge unit 620 is adhered. That is, the conveyance unit 200 conveys, as the object OH to be heated, the printing medium on which the liquid is adhered. As shown in FIG. 17, the object OH to be heated may be continuously conveyed from the liquid discharge device 610 to the dielectric heating apparatus 100. In this case, for example, the conveyance unit 200 of the dielectric heating apparatus 100 may function as the medium conveyance unit 630. In addition, the object OH to be heated may not be continuously conveyed from the liquid discharge device 610 to the dielectric heating apparatus 100. For example, after the printing medium on which the liquid discharged by the liquid discharge device 610 is adhered is once wound in a roll shape, the wound printing medium may be moved to the dielectric heating apparatus 100 by a robot or the like. In this case, the object OH to be heated can be heated in the dielectric heating apparatus 100 by conveying the rolled printing medium as the object OH to be heated by the conveyance unit 200 while unwinding the printing medium.

According to the eighth embodiment described above, it is also possible to prevent a vapor generated by the heating of the object OH to be heated from retaining in the case unit 300. In other embodiments, the configurations described in the second to seventh embodiments may be adopted as the configuration of the dielectric heating apparatus 100 provided in the printing system 600.

I. Other Embodiments (I-1) In the embodiments described above, the first edge portion 317 is disposed around at least one of the first insertion port 312 and the first feed-out port 314. However, the first edge portion 317 may not be disposed around the first insertion port 312 or the first feed-out port 314. Similarly, the second edge portion 327 may not be disposed around the second insertion port 322 or the second feed-out port 324.

(I-2) In the embodiments described above, the sum of the opening areas of the second opening portions 326 is larger than the sum of the opening areas of the first opening portions 316. On the other hand, the sum of the opening areas of the second opening portions 326 may be equal to or smaller than the sum of the opening areas of the first opening portions 316.

(I-3) In the embodiments described above, the first cover unit 310 is made of zinc. On the other hand, the first cover unit 310 may be made of a metal other than zinc, and may be made of, for example, carbon steel, stainless steel, aluminum, copper, or an alloy of various metals. Similarly, the second cover unit 320 and the third cover unit 330 may be made of a metal other than zinc.

(I-4) In the embodiments described above, the second electrode 40 is disposed so as to surround the first electrode 30 when viewed along the Z direction. On the other hand, for example, the first electrode 30 and the second electrode 40 may be disposed so as to be adjacent to each other when viewed along the Z direction. In this case, for example, when the frequency $f_0$ of the high frequency voltage applied to the electrode unit 20 is 2.45 GHz, an area of the first electrode 30 and an area of the second electrode 40 when viewed along the Z direction is preferably 0.01 $cm^2$ or more and 100.0 $cm^2$ or less, more preferably 0.1 $cm^2$ or more and 10.0 $cm^2$ or less, even more preferably 0.5 $cm^2$ or more and 2.0 $cm^2$ or less, and still more preferably 0.5 $cm^2$ or more and 1.0 $cm^2$ or less. Accordingly, the radiation of the far electromagnetic field from the first electrode 30 and the second electrode 40 can be prevented. When the frequency $f_0$ is lower than 2.45 GHz, the radiation of the far electromagnetic field from the first electrode 30 and the second electrode 40 can be effectively prevented even when each area is smaller than the above. In this case, the shape of the first electrode 30 and the shape of the second electrode 40 may be any shape, and may be a circular shape, an oval shape, a rectangular shape, a polygonal shape, or the like. When viewed along the Z direction, the area of the first electrode 30 and the area of the second electrode 40 may be the same as or different from each other. The first electrode 30 and the second electrode 40 are preferably disposed so as not to overlap each other when viewed along the Z direction.

(I-5) In the embodiments described above, the high frequency voltage is applied to the electrode unit 20. On the other hand, the frequency of the alternating current voltage applied to the electrode unit 20 may not be a high frequency as long as it is a frequency at which the object OH to be heated can be heated. The frequency of the alternating current voltage in this case is preferably, for example, 100 kHz or more and less than 1 MHz.

(I-6) In the embodiments described above, the case unit 300 may have a resin box portion, and the first cover unit 310 may be fixed to an inner wall surface of the box portion, for example. In this case, the box portion is provided with one or more opening portions at positions corresponding to at least one of the first opening portions 316 of the first cover unit 310. For example, a pipe or a duct for blowing air or sucking air into the case unit 300 may be coupled to the opening portion. In addition, the first cover unit 310 may be embedded in the wall surface of the box portion, and in this case, the box portion is provided with the same opening portion as described above. When the case unit **300*b* includes the second cover unit 320 described in the second embodiment, the second cover unit 320 may be similarly fixed to the inner wall surface of the box portion, or the second cover unit 320 may be embedded in the wall surface of the box portion. Since the first cover unit 310 and the second cover unit 320 are provided with the plurality of first opening portions 316 and the plurality of second opening portions 326, the degree of freedom of arrangement of the opening portions provided in the box portion can be increased as compared with a case where only a single opening portion is provided in the first cover unit 310 and the second cover unit 320**.

J. Other Embodiments

The present disclosure is not limited to the embodiments described above, and can be implemented in various forms without departing from the scope of the present disclosure. For example, the present disclosure can be implemented in the following aspects. In order to solve a part of or all of problems of the present disclosure, or to achieve a part of or all of effects of the present disclosure, technical features of the above-described embodiments corresponding to technical features in each of the following aspects can be replaced or combined as appropriate. In addition, when the technical characteristics are not described as essential in the present description, the technical characteristics can be deleted as appropriate.

(1) According to a first aspect of the present disclosure, a dielectric heating apparatus is provided. The dielectric heating apparatus includes: a conveyance unit configured to convey an object to be heated; an electrode unit including a first electrode and a second electrode which face the object to be heated, that is conveyed in a first direction, in a second direction intersecting the first direction and which are applied with an alternating current voltage; and a metal first cover unit surrounding the electrode unit. The first cover unit includes a first insertion port for inserting the object to be heated into the first cover unit, a first feed-out port for feeding the object to be heated out of the first cover unit, and a plurality of first opening portions that are different from the first insertion port and the first feed-out port.

According to this aspect, vapor generated by the heating of the object to be heated by the first cover unit can be moved to the outside of the first cover unit through the first opening portion, and thus retention of the vapor in the first cover unit can be prevented. Therefore, it is possible to prevent a liquid generated by condensation of the retained vapor from contaminating the object to be heated, and to prevent a decrease in drying efficiency when the object to be heated is dried by heating.

(2) In the above aspect, the dielectric heating apparatus may further include an edge portion made of an electrically insulating magnetic material and continuously surrounding at least one of the first insertion port and the first feed-out port. According to this aspect, the electromagnetic field radiated from the first insertion port or the first feed-out port to the outside of the first cover unit can be prevented by the edge portion.

(3) In the above aspect, the dielectric heating apparatus may further include a metal second cover unit surrounding the first cover unit. The second cover unit may include a second insertion port for inserting the object to be heated into the second cover unit, a second feed-out port for feeding the object to be heated out of the second cover unit, and a plurality of second opening portions that are different from the second insertion port and the second feed-out port. According to this aspect, the radiation wave from the electrode unit can be prevented not only by the first cover unit but also by the second cover unit, so that a radiation wave having a higher intensity can be blocked by the first cover unit and the second cover unit as a whole as compared with a case where the second cover unit is not provided. Therefore, for example, a higher voltage can be applied to the first electrode and the second electrode of the electrode unit, and the heating efficiency of the object to be heated can be further increased.

(4) In the above aspect, a sum of opening areas of the second opening portions may be larger than a sum of opening areas of the first opening portions. According to this aspect, as compared with a case where the sum of the opening areas of the second opening portions is equal to or less than the sum of the opening areas of the first opening portions, the retention of the vapor in the second cover unit can be further prevented and the weight of the second cover unit can be reduced.

(5) In the above aspect, a plurality of the electrode units may be provided. The plurality of electrode units may be arranged side by side in a third direction which intersects the first direction and which is orthogonal to the second direction. According to this aspect, even in a case of heating the object to be heated that has a larger dimension in the third direction, the object to be heated can be efficiently heated by the plurality of electrode units while being conveyed in the first direction.

(6) In the above aspect, the dielectric heating apparatus may further include a movement unit configured to reciprocate the electrode unit in a fourth direction which intersects the first direction and which is orthogonal to the second direction. According to this aspect, for example, even in a case of heating the object to be heated that has a larger dimension in the fourth direction, the object to be heated can be efficiently heated by the electrode unit reciprocated in the fourth direction while being conveyed in the first direction. Therefore, for example, even when a plurality of electrode units are not provided, the object to be heated that has a larger dimension in the fourth direction can be efficiently heated.

(7) In the above aspect, the dielectric heating apparatus may further include a metal third cover unit disposed in the first cover unit, covering the electrode unit, and facing, in the second direction, the object to be heated that is conveyed in the first direction. The third cover unit may be configured to reciprocate in the fourth direction together with the electrode unit, and may include a third opening portion that opened toward the object to be heated in the second direction and surrounding the first electrode and the second electrode when viewed along the second direction, and a plurality of fourth opening portions that are different from the third opening portion. According to this aspect, the radiation wave from the electrode unit can be prevented not only by the first cover unit but also by the third cover unit, so that a radiation wave having a higher intensity can be blocked by the first cover unit and the third cover unit as a whole as compared with a case where the third cover unit is not provided. Since the third cover unit is configured to reciprocate in the fourth direction together with the electrode unit, weight reduction and cost reduction of the dielectric heating apparatus can be implemented by setting the dimension of the third cover unit in the fourth direction to a dimension sufficient to accommodate the electrode unit. Further, since the third cover unit is provided with the plurality of fourth opening portions, it is possible to prevent the vapor generated by the heating of the object to be heated from retaining in the third cover unit.

(8) In the aspect above, the first cover unit may be made of zinc. According to this aspect, the weight of the first cover unit can be reduced as compared with a case where the first cover unit is made of, for example, carbon steel or copper. In addition, for example, the strength of the first cover unit can be further increased as compared with a case where the first cover unit is made of aluminum.

(9) In the above aspect, the dielectric heating apparatus may further include an airflow generation unit configured to generate an airflow in the first cover unit. According to this aspect, by generating the airflow in the first cover unit by the airflow generation unit, the inside and the outside of the first cover unit can be efficiently ventilated. Therefore, it is possible to further prevent the vapor generated by the heating of the object to be heated from retaining in the first cover unit.

(10) According to a second aspect of the present disclosure, a dielectric heating apparatus is provided. The dielectric heating apparatus includes: a conveyance unit configured to convey an object to be heated; an electrode unit including a first electrode and a second electrode which face the object to be heated, that is conveyed in a first direction, in a second direction intersecting the first direction and which are applied with an alternating current voltage; a movement unit configured to reciprocate the electrode unit in a fifth direction which intersects the first direction and which is orthogonal to the second direction; a metal fourth cover unit facing, in the second direction, the object to be heated that is conveyed in the first direction and covering the electrode unit; and a metal facing unit facing, in a direction along the second direction, the first electrode and the second electrode with the object to be heated interposed therebetween. The fourth cover unit is configured to reciprocate in the fifth direction together with the electrode unit, and includes a fifth opening portion opened toward the object to be heated in the second direction and surrounding the first electrode and the second electrode when viewed along the second direction.

According to this aspect, even without providing a casing for heating the object to be heated while preventing leakage of the radiation wave from the electrode unit, the object to be heated can be heated by the electrode unit while the radiation wave can be blocked by the fourth cover unit and the facing unit. Therefore, the retention of the vapor generated by the heating of the object to be heated can be prevented. Accordingly, it is possible to prevent the liquid generated by condensation of the retained vapor from contaminating the object to be heated, and to prevent a decrease in drying efficiency when the object to be heated is dried by heating.

(11) According to a third embodiment of the present disclosure, a printing system is provided. The printing system includes: the dielectric heating apparatus according to the aspect described above; and a liquid discharge unit configured to discharge a liquid to a printing medium. The conveyance unit conveys, as the object to be heated, the printing medium on which the liquid is adhered.

What is claimed is:

1. A dielectric heating apparatus, comprising:
- a conveyance unit configured to convey an object to be heated;
- an electrode unit including a first electrode and a second electrode which face the object to be heated, that is conveyed in a first direction, in a second direction intersecting the first direction and which are applied with an alternating current voltage; and
- a metal first cover unit surrounding the electrode unit, wherein
- the metal first cover unit includes
  - a first insertion port for inserting the object to be heated into the metal first cover unit,
  - a first feed-out port for feeding the object to be heated out of the metal first cover unit, and
  - a plurality of first opening portions that are different from the first insertion port and the first feed-out port, and
- the dielectric heating apparatus further includes an edge portion made of an electrically insulating magnetic material and continuously surrounding at least one of the first insertion port and the first feed-out port.

2. The dielectric heating apparatus according to claim 1, further comprising:
- a metal second cover unit surrounding the metal first cover unit, wherein
- the metal second cover unit includes
  - a second insertion port for inserting the object to be heated into the metal second cover unit,
  - a second feed-out port for feeding the object to be heated out of the metal second cover unit, and
  - a plurality of second opening portions that are different from the second insertion port and the second feed-out port.

3. The dielectric heating apparatus according to claim 2, wherein
- a sum of opening areas of the second opening portions is larger than a sum of opening areas of the first opening portions.

4. The dielectric heating apparatus according to claim 1, further comprising:
- a plurality of the electrode units are provided, wherein
- the plurality of electrode units are arranged side by side in a third direction which intersects the first direction and which is orthogonal to the second direction.

5. The dielectric heating apparatus according to claim 1, further comprising:
- a movement unit configured to reciprocate the electrode unit in a fourth direction which intersects the first direction and which is orthogonal to the second direction.

6. The dielectric heating apparatus according to claim 5, further comprising:
- a metal third cover unit disposed in the metal first cover unit, covering the electrode unit, and facing, in the second direction, the object to be heated that is conveyed in the first direction, wherein
- the meal third cover unit is configured to reciprocate in the fourth direction together with the electrode unit, and includes
  - a third opening portion opened toward the object to be heated in the second direction and surrounding the first electrode and the second electrode when viewed along the second direction, and
  - a plurality of fourth opening portions that are different from the third opening portion.

7. The dielectric heating apparatus according to claim 1, wherein
- the metal first cover unit is made of zinc.

8. The dielectric heating apparatus according to claim 1, further comprising:
- an airflow generation unit configured to generate an airflow in the metal first cover unit.

9. A printing system, comprising:
- the dielectric heating apparatus according to claim 1; and
- a liquid discharge unit configured to discharge a liquid onto a printing medium, wherein
- the conveyance unit conveys, as the object to be heated, the printing medium on which the liquid is adhered.

10. A dielectric heating apparatus, comprising:
- a conveyance unit configured to convey an object to be heated;
- an electrode unit including a first electrode and a second electrode which face the object to be heated, that is conveyed in a first direction, in a second direction intersecting the first direction and which are applied with an alternating current voltage; and
- a metal first cover unit surrounding the electrode unit, the metal first cover unit being in a rectangular parallelepiped having a top surface, a bottom surface, and first, second, third, and fourth sidewalls, wherein
- the metal first cover unit includes:
  - a first insertion port for inserting the object to be heated into the metal first cover unit, and the first insertion port is formed in the first sidewall;
  - a first feed-out port for feeding the object to be heated out of the metal first cover unit, and the first feed-out port is formed in the second sidewall facing the first sidewall; and
  - a plurality of first opening portions that are different from the first insertion port and the first feed-out port, and the plurality of first opening portions are formed in only the third sidewall.

11. The dielectric heating apparatus according to claim 10, further comprising:

an edge portion made of an electrically insulating magnetic material and continuously surrounding at least one of the first insertion port and the first feed-out port.

12. The dielectric heating apparatus according to claim 10, further comprising:

a metal second cover unit surrounding the metal first cover unit, wherein the metal second cover unit includes a second insertion port for inserting the object to be heated into the metal second cover unit, a second feed-out port for feeding the object to be heated out of the metal second cover unit, and a plurality of second opening portions that are different from the second insertion port and the second feed-out port.

13. The dielectric heating apparatus according to claim 12, wherein a sum of opening areas of the second opening portions is larger than a sum of opening areas of the first opening portions.

14. The dielectric heating apparatus according to claim 10, further comprising:

a plurality of the electrode units are provided, wherein the plurality of electrode units are arranged side by side in a third direction which intersects the first direction and which is orthogonal to the second direction.

15. The dielectric heating apparatus according to claim 10, further comprising:

a movement unit configured to reciprocate the electrode unit in a fourth direction which intersects the first direction and which is orthogonal to the second direction.

16. The dielectric heating apparatus according to claim 15, further comprising:

a metal third cover unit disposed in the metal first cover unit, covering the electrode unit, and facing, in the second direction, the object to be heated that is conveyed in the first direction, wherein the metal third cover unit is configured to reciprocate in the fourth direction together with the electrode unit, and includes a third opening portion opened toward the object to be heated in the second direction and surrounding the first electrode and the second electrode when viewed along the second direction, and a plurality of fourth opening portions that are different from the third opening portion.

17. The dielectric heating apparatus according to claim 10, wherein the metal first cover unit is made of zinc.

18. The dielectric heating apparatus according to claim 10, further comprising:

an airflow generation unit configured to generate an airflow in the metal first cover unit.

19. A printing system, comprising:

the dielectric heating apparatus according to claim 10; and a liquid discharge unit configured to discharge a liquid onto a printing medium, wherein the conveyance unit conveys, as the object to be heated, the printing medium on which the liquid is adhered.

* * * * *